(12) United States Patent
Yao

(10) Patent No.: US 7,719,798 B2
(45) Date of Patent: May 18, 2010

(54) ROTATIONAL MICRO-ACTUATOR INTEGRATED WITH SUSPENSION OF HEAD GIMBAL ASSEMBLY, AND DISK DRIVE UNIT WITH THE SAME

(75) Inventor: Minggao Yao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 574 days.

(21) Appl. No.: 11/353,018

(22) Filed: Feb. 14, 2006

(65) Prior Publication Data

US 2007/0188931 A1 Aug. 16, 2007

(51) Int. Cl.
*G11B 5/56* (2006.01)
*G11B 21/16* (2006.01)

(52) U.S. Cl. .................... 360/294.4; 360/245.1

(58) Field of Classification Search .............. 360/294.4, 360/294.1, 294.2, 294.3, 234.6, 245.1
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,831,815 B2 * | 12/2004 | Kasajima et al. | 360/294.4 |
| 6,950,266 B1 | 9/2005 | McCaslin et al. | |
| 7,046,486 B1 * | 5/2006 | Coffey | 360/294.4 |
| 7,411,764 B2 * | 8/2008 | Yang et al. | 360/294.4 |
| 7,417,831 B2 * | 8/2008 | Yao et al. | 360/294.4 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2006/0023338 A1 | 2/2006 | Sharma et al. | |
| 2006/0050442 A1 | 3/2006 | Yao et al. | |

(Continued)

FOREIGN PATENT DOCUMENTS

JP  2002-74871  3/2002

(Continued)

OTHER PUBLICATIONS

U.S. Appl. No. 11/238,998, Sep. 2005, Yang et al.

(Continued)

*Primary Examiner*—Brian E Miller
(74) *Attorney, Agent, or Firm*—Nixon & Vanderhye, P.C.

(57) ABSTRACT

A micro-actuator for a head gimbal assembly includes a metal frame including a bottom support integrated with a suspension flexure of the head gimbal assembly, a top support adapted to support a slider of the head gimbal assembly, and a pair of side arms that interconnect the top support and the bottom support. The top support includes a rotatable plate, connection arms that couple the rotatable plate to respective side arms, and an electrical pad support plate that supports bonding pads. A PZT element is mounted to each of the side arms. Each PZT element is excitable to cause selective movement of the side arms.

30 Claims, 20 Drawing Sheets

U.S. PATENT DOCUMENTS

| | | | |
|---|---|---|---|
| 2006/0072247 A1 | 4/2006 | Yao et al. | |
| 2006/0077594 A1* | 4/2006 | White et al. | 360/294.4 |
| 2006/0082917 A1 | 4/2006 | Yao et al. | |
| 2006/0098347 A1* | 5/2006 | Yao et al. | 360/294.4 |
| 2006/0146449 A1 | 7/2006 | Yao et al. | |
| 2006/0181812 A1* | 8/2006 | Kwon et al. | 360/294.4 |
| 2006/0193086 A1* | 8/2006 | Zhu et al. | 360/294.4 |
| 2007/0002500 A1* | 1/2007 | Yao et al. | 360/294.4 |
| 2007/0070552 A1* | 3/2007 | Yao et al. | 360/294.4 |
| 2007/0097554 A1* | 5/2007 | Yao et al. | 360/294.4 |
| 2007/0153428 A1* | 7/2007 | Yao et al. | 360/294.4 |

FOREIGN PATENT DOCUMENTS

| | | |
|---|---|---|
| JP | 2002-133803 | 5/2002 |

OTHER PUBLICATIONS

U.S. Appl. No. 11/169,019, Jun. 2005, Yao et al.
U.S. Appl. No. 11/080,659, Mar. 2005, Yao et al.
U.S. Appl. No. 11/050,823, Jan. 2005, Yao et al.
U.S. Appl. No. 11/080,657, Mar. 2005, Zhu et al.
U.S. Appl. No. 11/235,549, Sep. 2005, Yao et al.
U.S. Appl. No. 11/304,623, Dec. 2005, Yao et al.
U.S. Appl. No. 11/169,003, Jun. 2005, Yao et al.
U.S. Appl. No. 11/125,248, May 2005, Yao et al.
U.S. Appl. No. 11/263,998, Nov. 2005, Yao.
U.S. Appl. No. 11/265,385, Nov. 2005, Yao et al.
U.S. Appl. No. 11/192,121, Jul. 2005, Yao et al.
U.S. Appl. No. 11/304,544, Dec. 2005, Yao.
U.S. Appl. No. 11/300,339, Dec. 2005, Yao et al.
U.S. Appl. No. 11/385,704, Mar. 2006, Yao et al.
U.S. Appl. No. 11/385,698, Mar. 2006, Yao et al.
U.S. Appl. No. 11/319,577, Dec. 2005, Yao et al.
U.S. Appl. No. 11/273,075, Nov. 2005, Yao.
U.S. Appl. No. 11/319,580, Dec. 2005, Yao et al.
U.S. Appl. No. 11/384,404, Mar. 2006, Yao.
U.S. Appl. No. 11/414,546, May 2006, Yao et al.
U.S. Appl. No. 11/440,354, May 2006, Li.

* cited by examiner

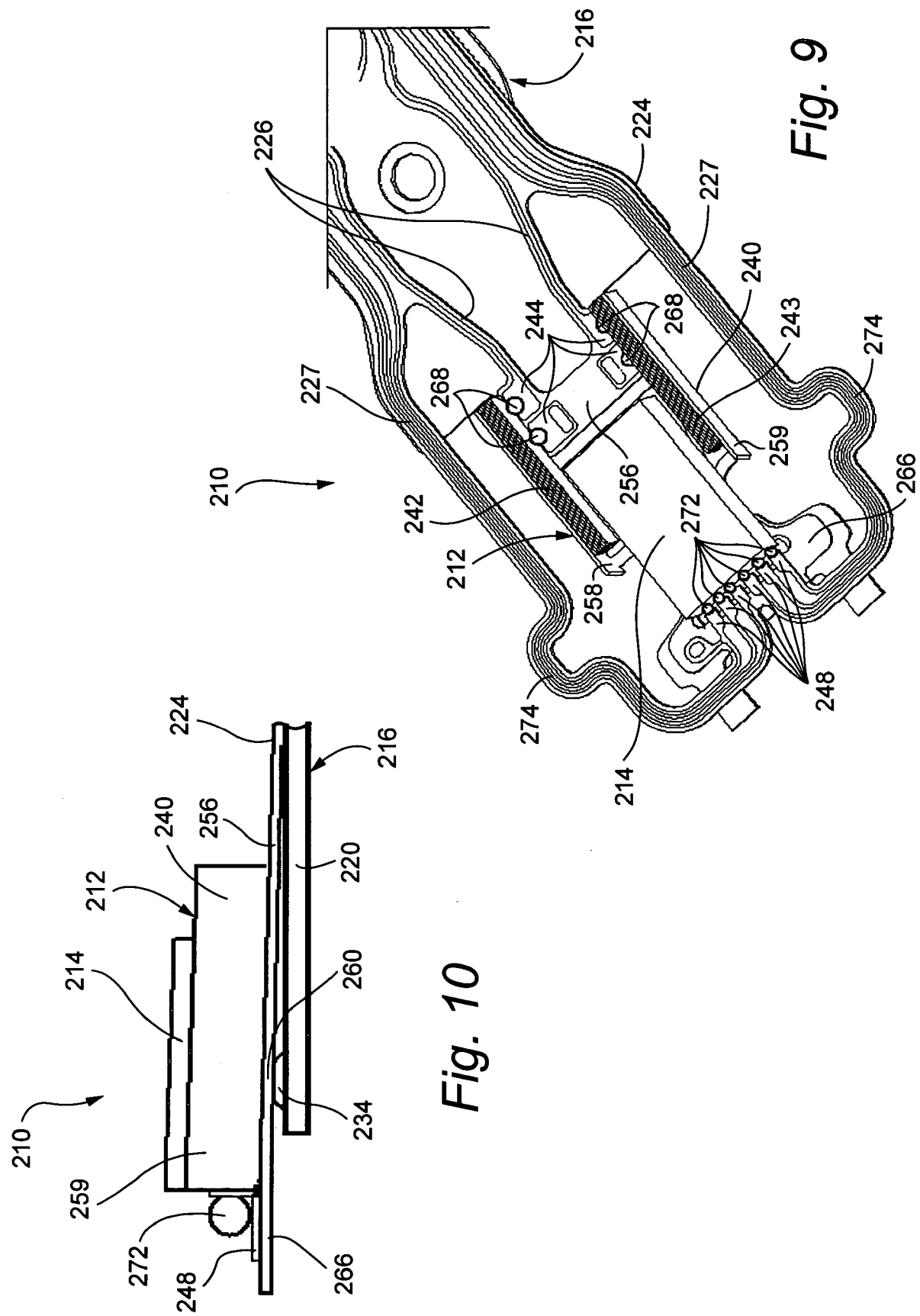

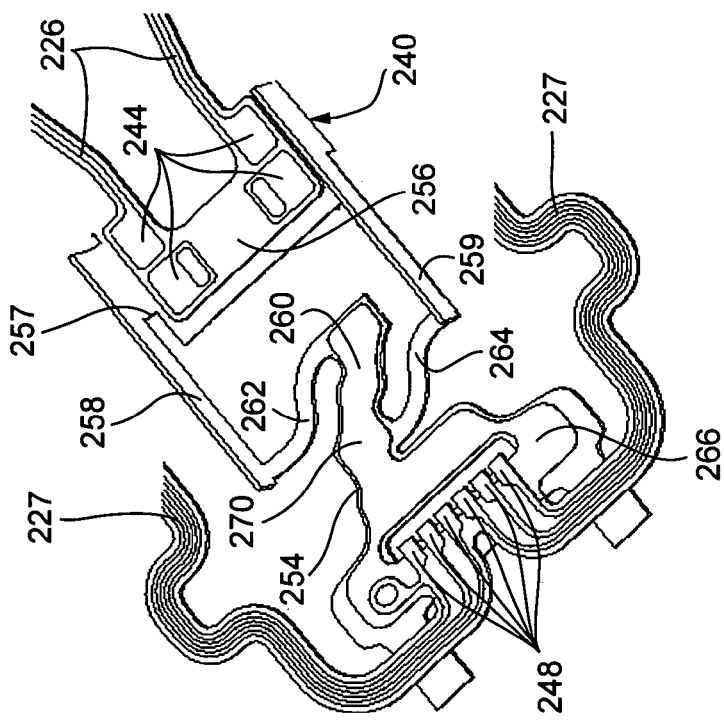

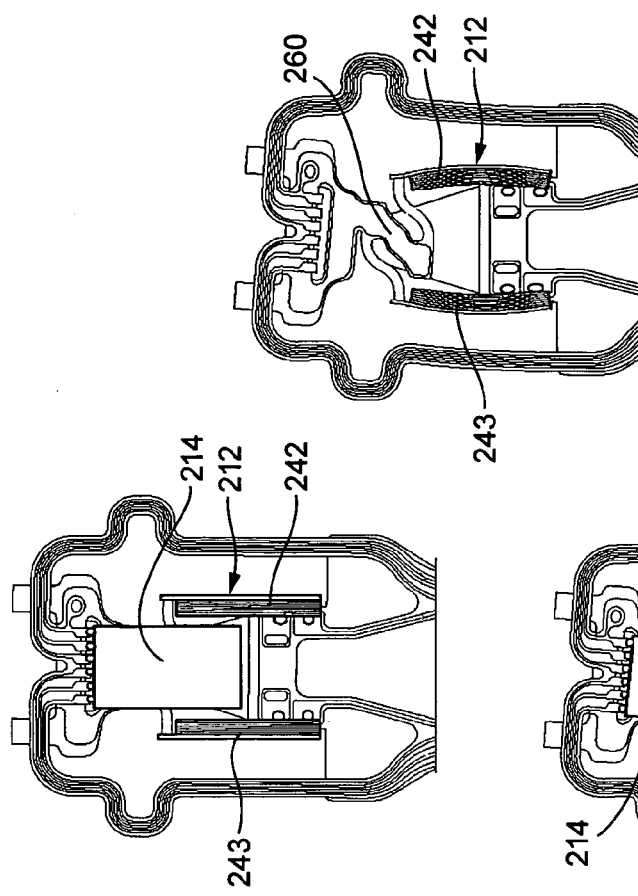
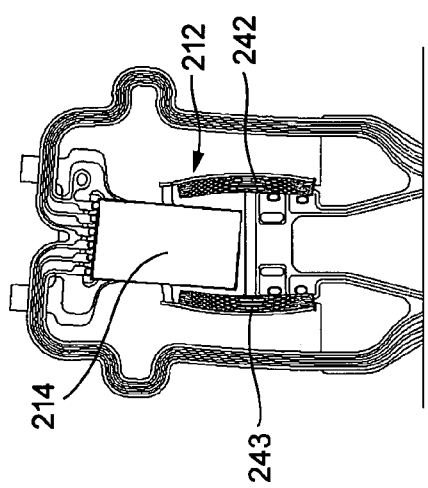
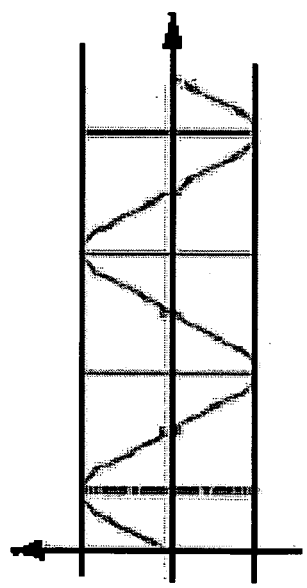
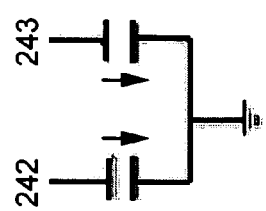
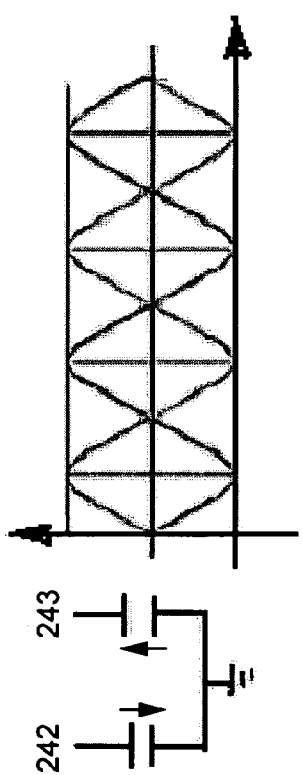

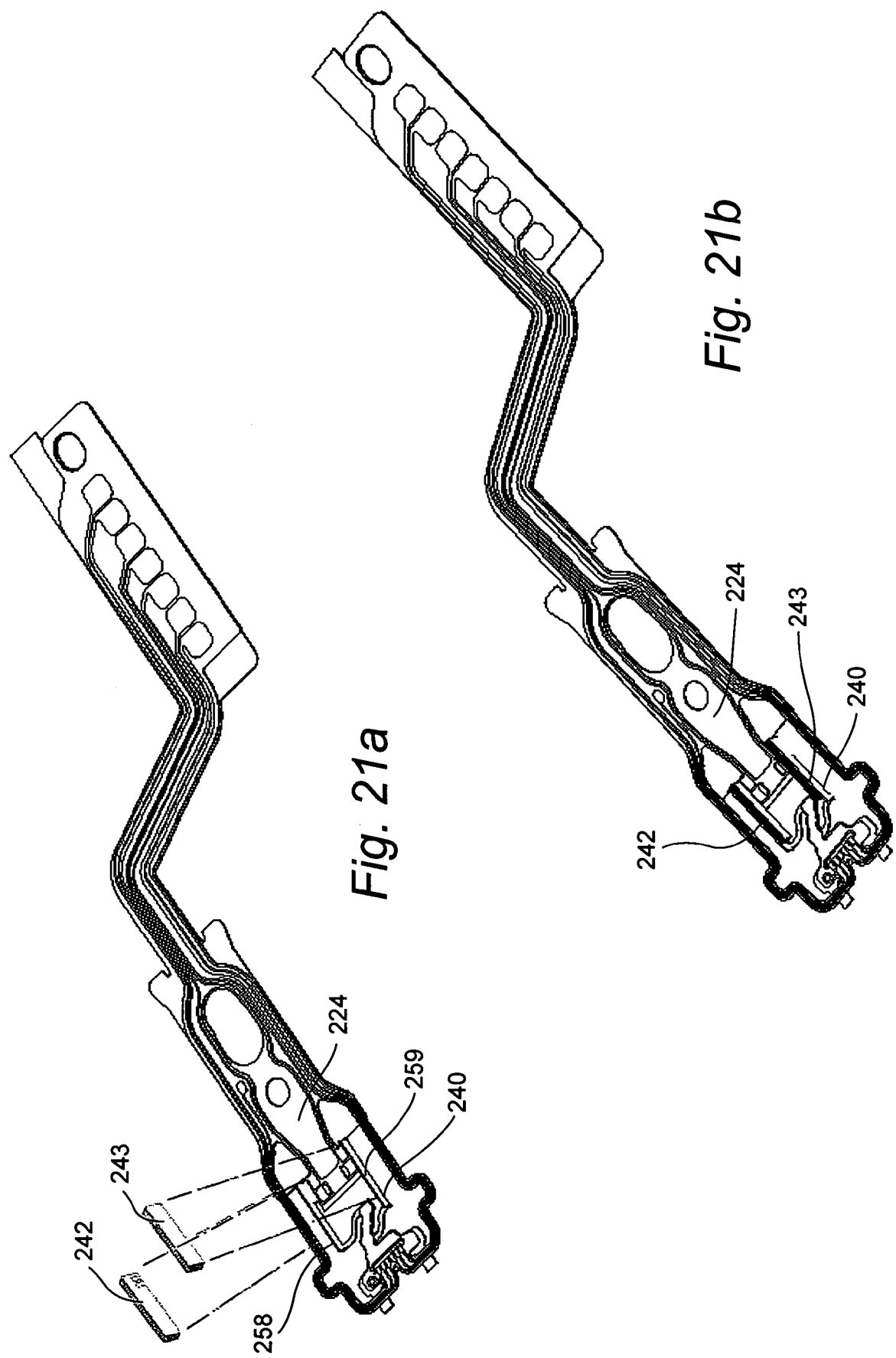

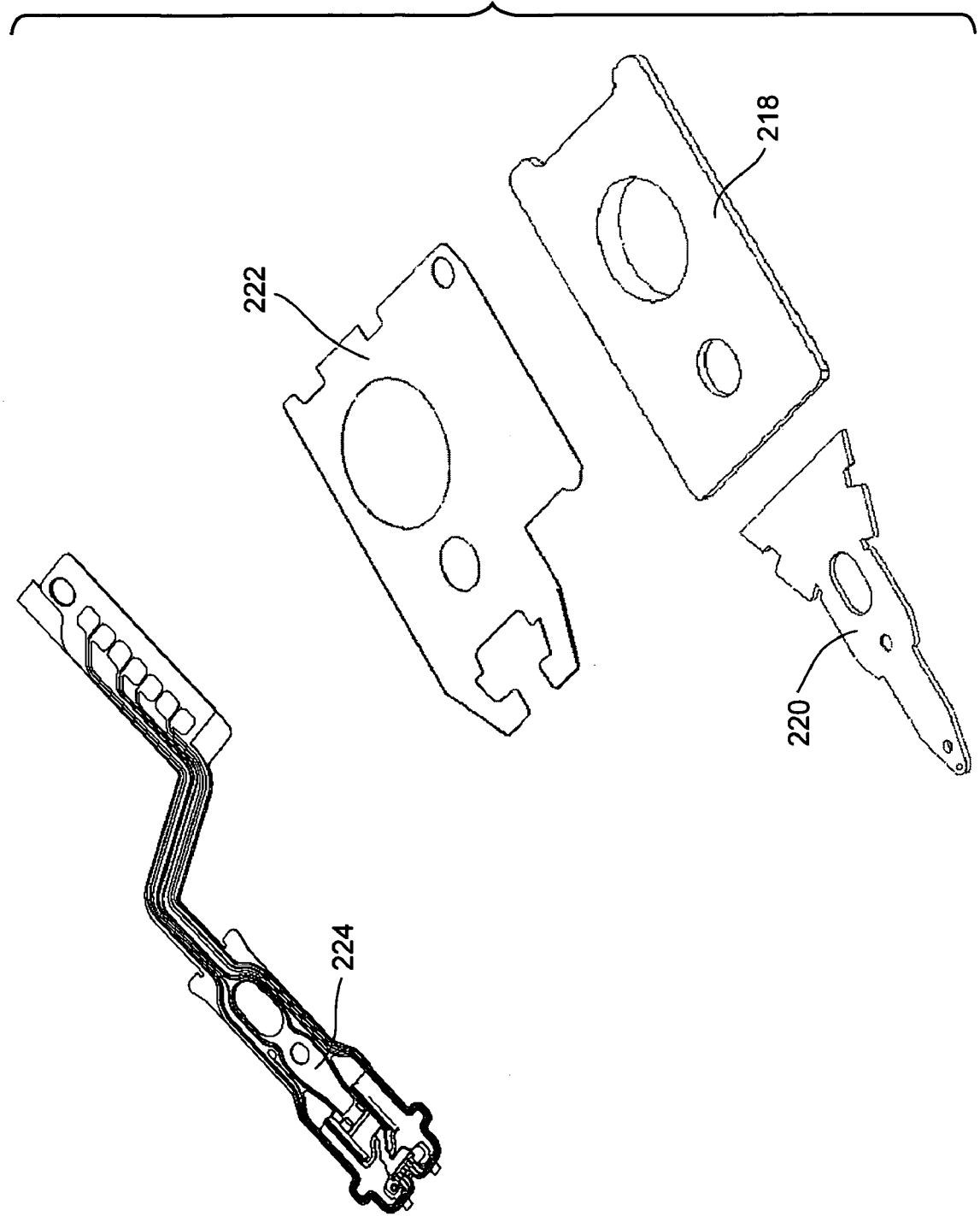

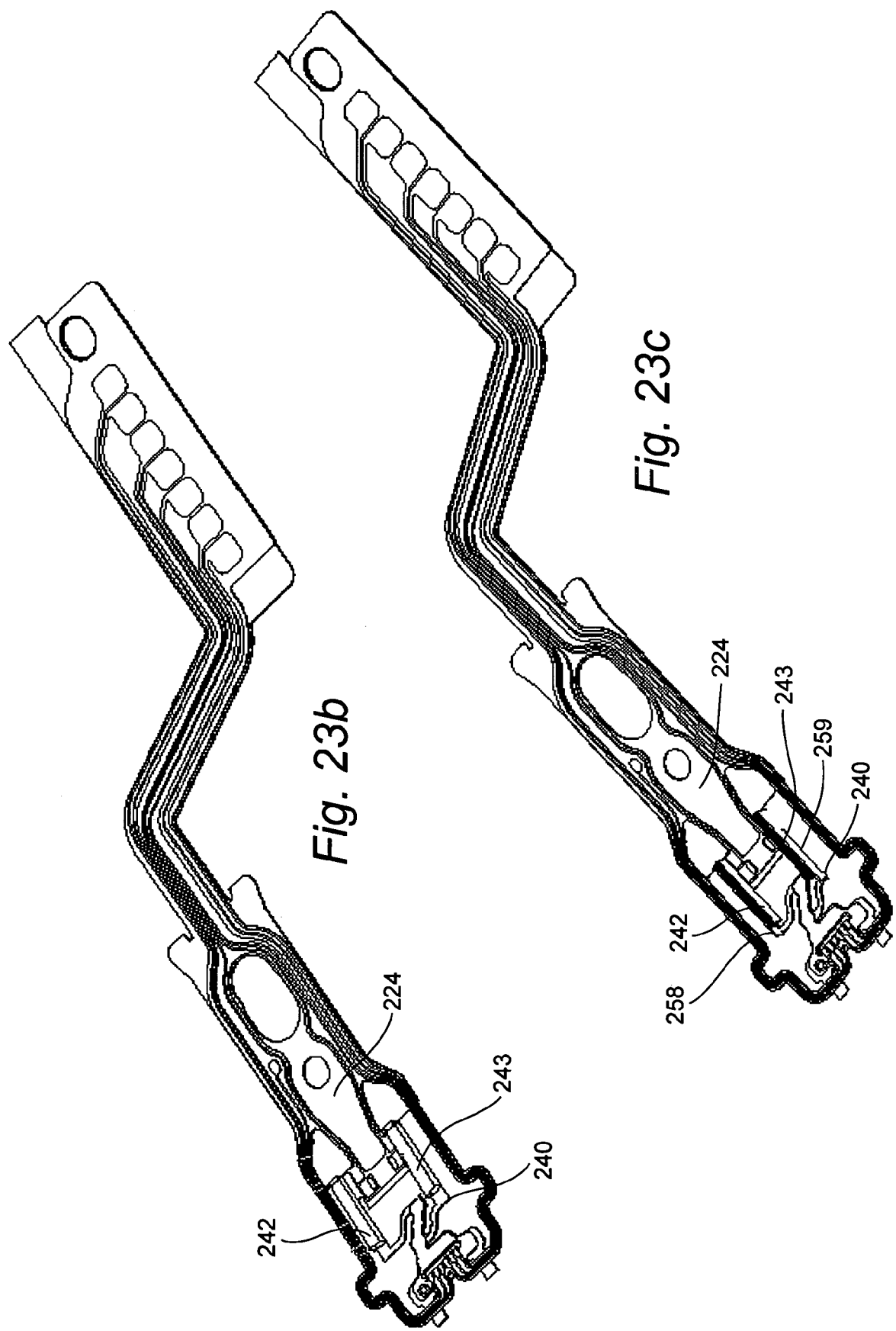

ROTATIONAL MICRO-ACTUATOR INTEGRATED WITH SUSPENSION OF HEAD GIMBAL ASSEMBLY, AND DISK DRIVE UNIT WITH THE SAME

FIELD OF THE INVENTION

The present invention relates to information recording disk drive units and, more particularly, to a micro-actuator for a head gimbal assembly (HGA) of the disk drive unit.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly." Other exemplary PZT micro-actuators are also disclosed in, for example, U.S. Pat. Nos. 6,671,131 and 6,700,749.

FIG. 1 illustrates a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 2 illustrates the head gimbal assembly (HGA) 100 of the conventional disk drive device of FIG. 1 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIG. 2, the HGA 100 includes a suspension 106 having a flexure 108. The flexure 108 provides a suspension tongue 110 to load the PZT micro-actuator 105 and the slider 103. Suspension traces 112 are provided to the flexure 108 and extend on opposite sides of the suspension tongue 110. The suspension traces 112 electrically couple the PZT micro-actuator 105 and the slider 103 with bonding pads 120 which connect to a control system.

Referring to FIG. 3, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 attached thereto. The slider 103 is supported on the top support 132.

Referring to FIG. 4, the PZT micro-actuator 105 is physically coupled to the suspension tongue 110 by the bottom support 134 of the frame 130. The bottom support 134 may be mounted on the suspension tongue 110 by epoxy or laser welding, for example. Multi balls for example three electrical connection balls 150 (gold ball bonding or solder ball bonding, GBB or SBB) are provided to couple the PZT micro-actuator 105 to the suspension traces 112 located at the side of each PZT element 140, 142. In addition, there are multi ball for example four metal balls 152 (GBB or SBB) for coupling the slider 103 to the traces 112 for electrical connection of the read/write transducers.

Referring to FIG. 5, the load beam 160 of the suspension 106 has a dimple 162 formed thereon that supports the suspension tongue 110. A parallel gap 170 is provided between the suspension tongue 110 and the PZT micro-actuator 105 to allow the PZT micro-actuator 105 and slider 103 to move smoothly and freely in use.

When power is supplied through the suspension traces 112, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement of the slider 103 connected thereto, thereby making the slider 103 move on the track of the disk in order to fine tune the position of the read/write head. In this manner, controlled displacement of slider 103 can be achieved for fine positional tuning.

FIG. 6 illustrates how the PZT micro-actuator 105 works when a voltage is applied to the PZT elements 140, 142. For example, when a positive sine voltage is input to the PZT element 140 of the micro-actuator which has a positive polarization, in the first half period, the PZT element 140 will shrink and cause the side arm 136 to deform as a water waveform shape. Since the slider 103 is mounted on the top support 132, this deformation will cause the slider to move or sway towards the left side. Likewise, when a negative sine voltage is input to the PZT element 142 of the micro-actuator which has a positive polarization, in the second half period, the PZT element 142 will shrink and cause the side arm 138 to deform as a water waveform shape. This deformation will cause the slider 103 to move or sway towards the right side. Of course, this operation may depend on the electric control circle and PZT element polarization direction, but the work principle is well known.

The PZT micro-actuator 105 works in a translational or sway-like manner in which the PZT elements 140, 142 undergo intermissive contraction and extension that causes the PZT micro-actuator to deform as a water waveform shape and move the slider in a sway-like manner. This intermissive motion will generate reaction forces in the suspension tongue 110 through the bottom support 134 mounted to the suspension tongue 110. These reaction forces will generate a suspension resonance, which limits the performance characteristics of the disk drive device, especially for the servo bandwidth.

For example, FIG. 7 illustrates testing data of the resonance of a prior PZT micro-actuator design. As illustrated, when the PZT micro-actuator is operated (exciting the PZT), a suspension resonance is generated due the relatively large reaction force of the suspension. The curve 160 illustrates a resonance when the suspension base plate is shaken or excited, and the curve 170 illustrates a resonance when the PZT element of the micro-actuator is excited. As illustrated, the curves 160, 170 have similar forms.

Thus, there is a need for an improved system that does not suffer from the above-mentioned drawbacks.

SUMMARY OF THE INVENTION

One aspect of the present invention relates to a micro-actuator structured to improve resonance performance of the HGA.

Another aspect of the present invention relates to a rotational micro-actuator that is integrated with the suspension flexure of the HGA.

Another aspect of the invention relates to a micro-actuator for a head gimbal assembly including a metal frame including a bottom support integrated with a suspension flexure of the head gimbal assembly, a top support adapted to support a slider of the head gimbal assembly, and a pair of side arms that interconnect the top support and the bottom support. The top support includes a rotatable plate, connection arms that couple the rotatable plate to respective side arms, and an electrical pad support plate that supports bonding pads. A PZT element is mounted to each of the side arms. Each PZT element is excitable to cause selective movement of the side arms.

Another aspect of the invention relates to a head gimbal assembly including a micro-actuator, a slider, and a suspension including a suspension flexure. The micro-actuator includes a metal frame including a bottom support integrated with the suspension flexure, a top support to support the slider, and a pair of side arms that interconnect the top support and the bottom support. The top support includes a rotatable plate, connection arms that couple the rotatable plate to respective side arms, and an electrical pad support plate that supports bonding pads. A PZT element is mounted to each of the side arms. Each PZT element is excitable to cause selective movement of the side arms.

Another aspect of the invention relates to a disk drive device including a head gimbal assembly, a drive arm connected to the head gimbal assembly, a disk, and a spindle motor operable to spin the disk. The head gimbal assembly includes a micro-actuator, a slider, and a suspension including a suspension flexure. The micro-actuator includes a metal frame including a bottom support integrated with the suspension flexure, a top support to support the slider, and a pair of side arms that interconnect the top support and the bottom support. The top support includes a rotatable plate, connection arms that couple the rotatable plate to respective side arms, and an electrical pad support plate that supports bonding pads. A PZT element is mounted to each of the side arms. Each PZT element is excitable to cause selective movement of the side arms.

Another aspect of the invention relates to a head gimbal assembly including a micro-actuator, a slider, and a suspension including a suspension flexure. The micro-actuator includes a metal frame including a bottom support integrated with the suspension flexure, a top support to support the slider, and a pair of side arms that interconnect the top support and the bottom support. The top support includes a rotatable plate, connection arms that couple the rotatable plate to respective side arms, and an electrical pad support plate that supports bonding pads. A PZT element is mounted to each of the side arms. Each PZT element is excitable to cause selective movement of the side arms. The suspension includes a load beam having a dimple that engages the rotatable plate. A center of the slider, a center of the rotatable plate, and the dimple are aligned along a common axis.

Another aspect of the invention relates to a method for manufacturing a head gimbal assembly. The method includes integrating a micro-actuator frame to a suspension flexure, mounting PZT elements to the micro-actuator frame, electrically connecting the PZT elements to suspension traces, conducting a performance check on the PZT elements, mounting a slider to the micro-actuator frame, electrically connecting the slider to suspension traces, conducting a performance check on the slider, and performing a final inspection.

Another aspect of the invention relates to a method for manufacturing a head gimbal assembly. The method includes integrating a micro-actuator frame to a suspension flexure, mounting PZT elements to the micro-actuator frame, mounting the suspension flexure to a suspension, electrically connecting the PZT elements to suspension traces, conducting a performance check on the PZT elements, mounting a slider to the micro-actuator frame, electrically connecting the slider to suspension traces, conducting a performance check on the slider, and performing a final inspection.

Another aspect of the invention relates to a method for manufacturing a head gimbal assembly. The method includes integrating a micro-actuator frame to a suspension flexure, mounting PZT elements to respective side arms of the micro-actuator frame, and mounting the suspension flexure to a suspension.

Yet another aspect of the invention relates to a method for manufacturing a head gimbal assembly. The method includes integrating a micro-actuator frame to a suspension flexure, mounting PZT elements to respective side arms of the micro-actuator frame, the side arms oriented in a substantially flat condition, bending the side arms to form upstanding side arms, and mounting the suspension flexure to a suspension.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 9 is a partial perspective view of the HGA shown in FIG. 8;

FIG. 10 is a partial side view of the HGA shown in FIG. 8;

FIG. 13 is a partial perspective view of the HGA shown in FIG. 8 with the slider removed;

FIG. 14 is a partial perspective view of the suspension flexure of the suspension shown in FIG. 11;

FIG. 15*a* illustrates an embodiment of the electrical connection structure between PZT elements of the PZT micro-actuator shown in FIG. 8;

FIG. 15*b* illustrates a voltage applied to the PZT elements of the PZT micro-actuator shown in FIG. 8;

FIG. 16*a* is a top view of the slider and PZT micro-actuator of the HGA shown in FIG. 8 in a relaxed state;

FIG. 16*b* is a top view of the slider and PZT micro-actuator of the HGA shown in FIG. 8 when a voltage is applied;

FIG. 16*c* is a top view of PZT micro-actuator of the HGA shown in FIG. 8 (without a slider) when a voltage is applied;

FIG. 17*a* illustrates another embodiment of the electrical connection structure between PZT elements of the PZT micro-actuator shown in FIG. 8;

FIG. 17*b* illustrates another voltage applied to the PZT elements of the PZT micro-actuator shown in FIG. 8;

FIGS. 21*a*-21*c* are sequential views illustrating a manufacturing and assembly process according to another embodiment of the present invention;

FIGS. 23*a*-23*d* are sequential views illustrating a manufacturing and assembly process according to another embodiment of the present invention;

DETAILED DESCRIPTION OF ILLUSTRATED EMBODIMENTS

Figure 1:
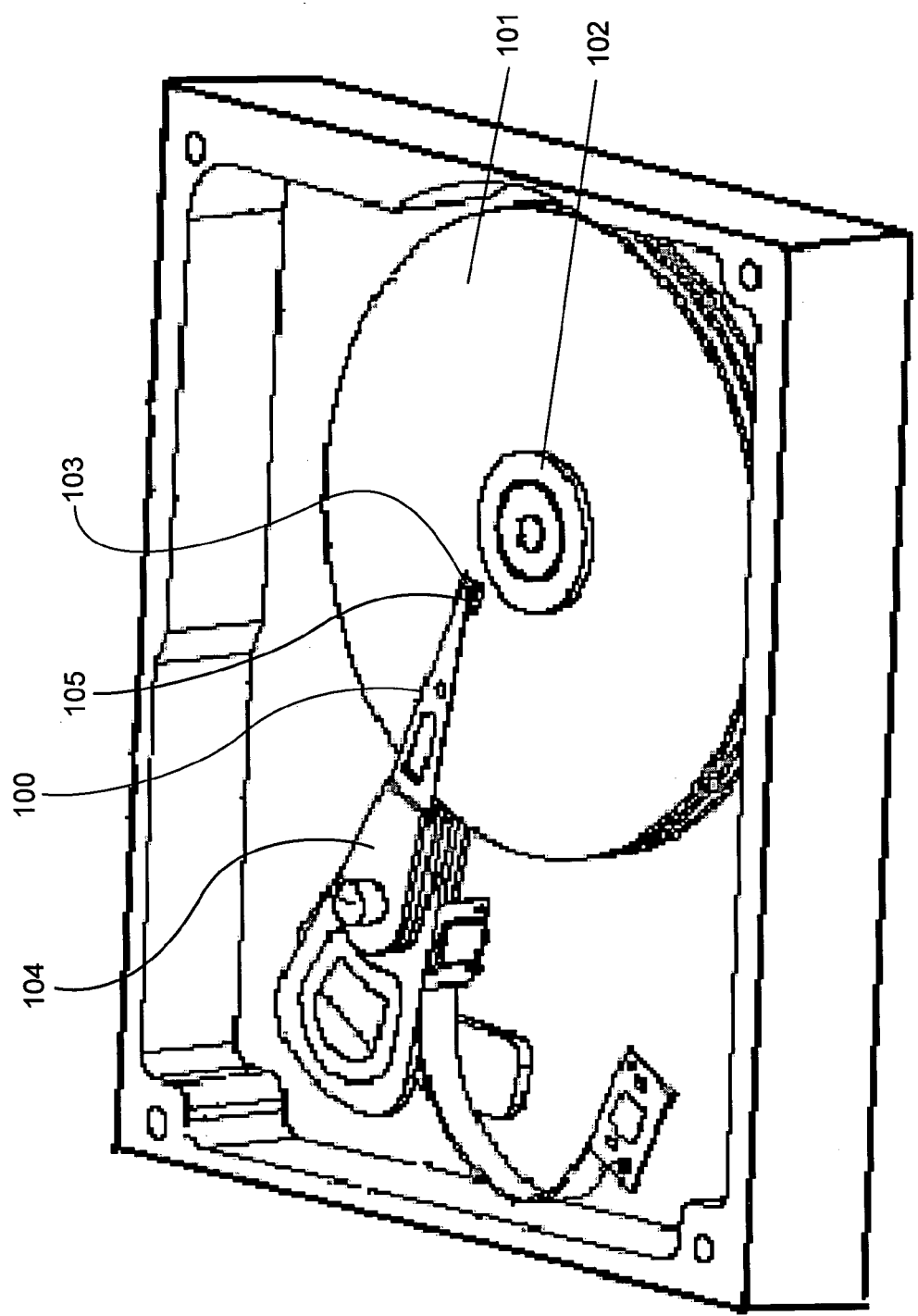
FIG. 1 is a perspective view of a conventional disk drive unit.
Figure 2:
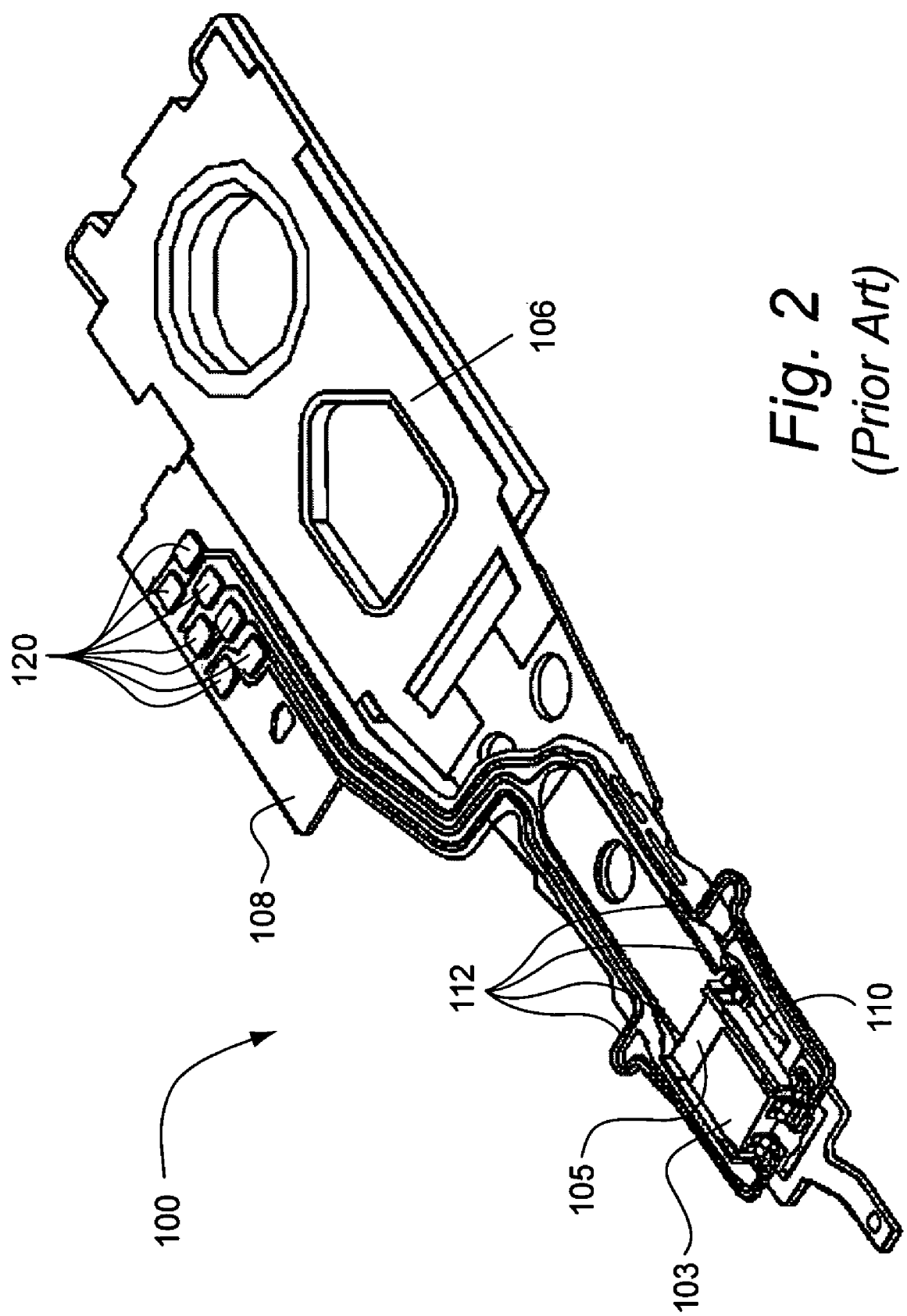
FIG. 2 is a perspective view of a conventional head gimbal assembly (HGA)
Figure 4:
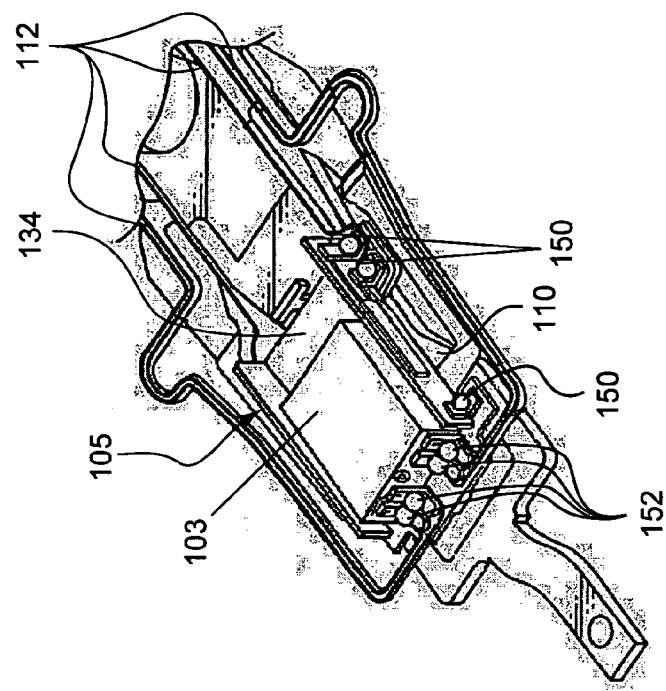
FIG. 4 is a partial perspective view of the HGA shown in FIG. 2.
Figure 3:
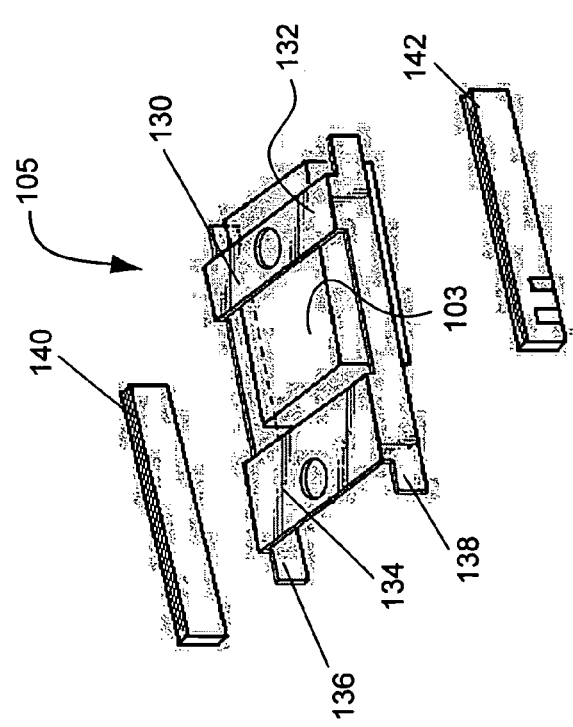
FIG. 3 is a perspective view of a slider and PZT micro-actuator of the HGA shown in FIG. 2.
Figure 5:
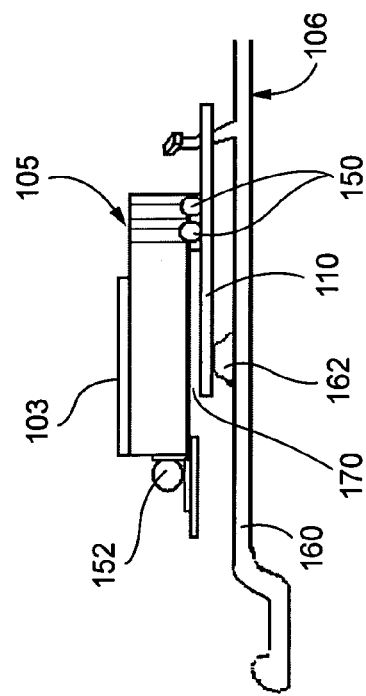
FIG. 5 is a partial side view of the HGA shown in FIG. 2.

Various preferred embodiments of the instant invention will now be described with reference to the figures, wherein like reference numerals designate similar parts throughout the various views. As indicated above, the instant invention is designed to improve resonance performance in a head gimbal assembly (HGA) while precisely actuating the slider using the micro-actuator. An aspect of the instant invention is to provide a rotation-type PZT micro-actuator that is integrated with the suspension flexure of the HGA to improve resonance performance in the HGA. By improving resonance performance of the HGA, the performance characteristics of the disk drive device are improved.

Several example embodiments of a micro-actuator for a HGA will now be described. It is noted that the micro-actuator may be implemented in any suitable disk drive device having a micro-actuator in which it is desired to improve resonance performance, regardless of the specific structure of the HGA as illustrated in the figures. That is, the invention may be used in any suitable device having a micro-actuator in any industry.

FIGS. 8-14 illustrate a head gimbal assembly (HGA) 210 incorporating a PZT micro-actuator 212 according to a first exemplary embodiment of the present invention. The HGA 210 includes a PZT micro-actuator 212, a slider 214, and a suspension 216. As described in greater detail below, the PZT micro-actuator 212 is integrated with the suspension 216 to load or support the slider 214.

Figure 8:
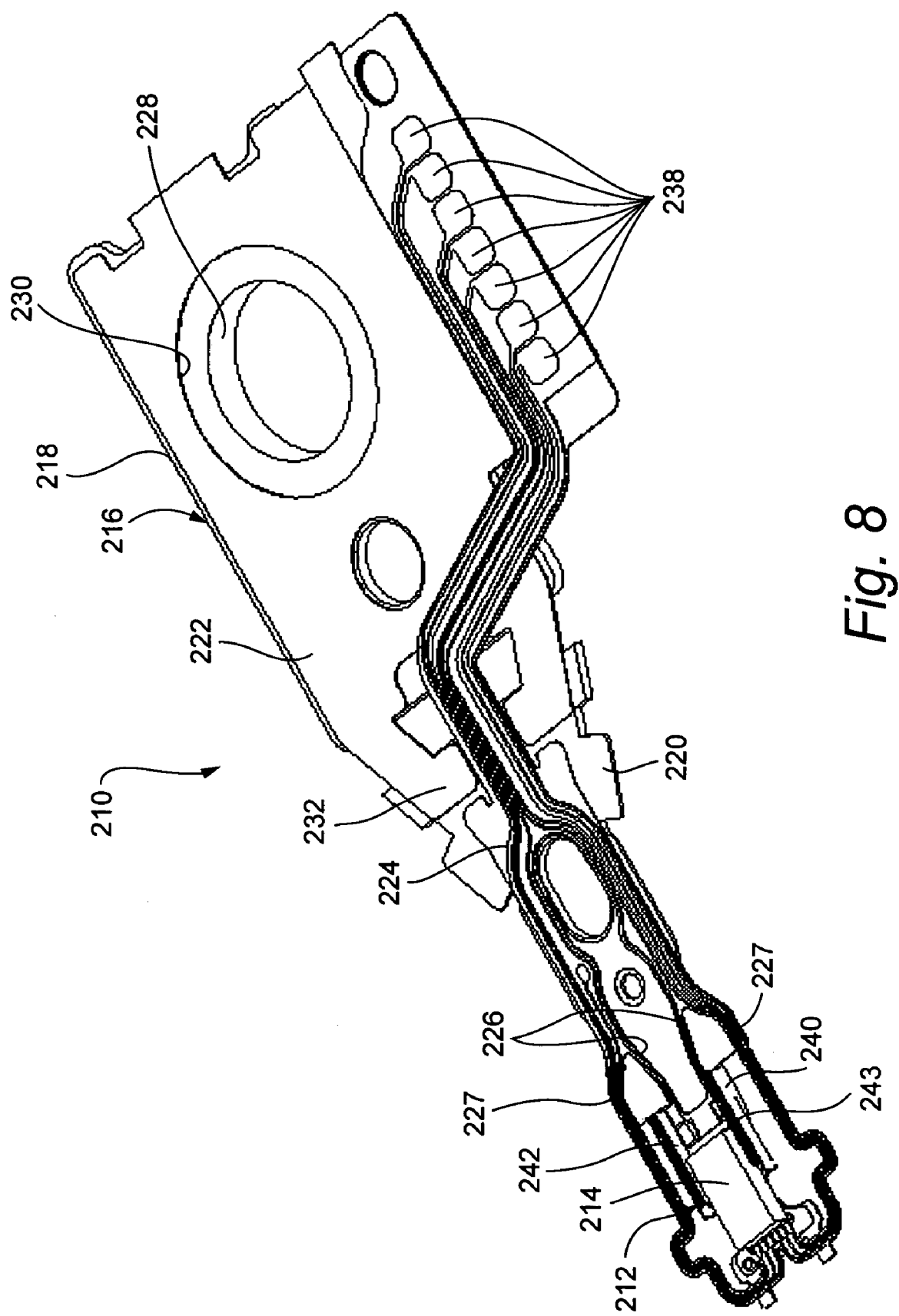
FIG. 8 is a perspective view of a head gimbal assembly (HGA) including a PZT micro-actuator according to an embodiment of the present invention.
Figure 11:
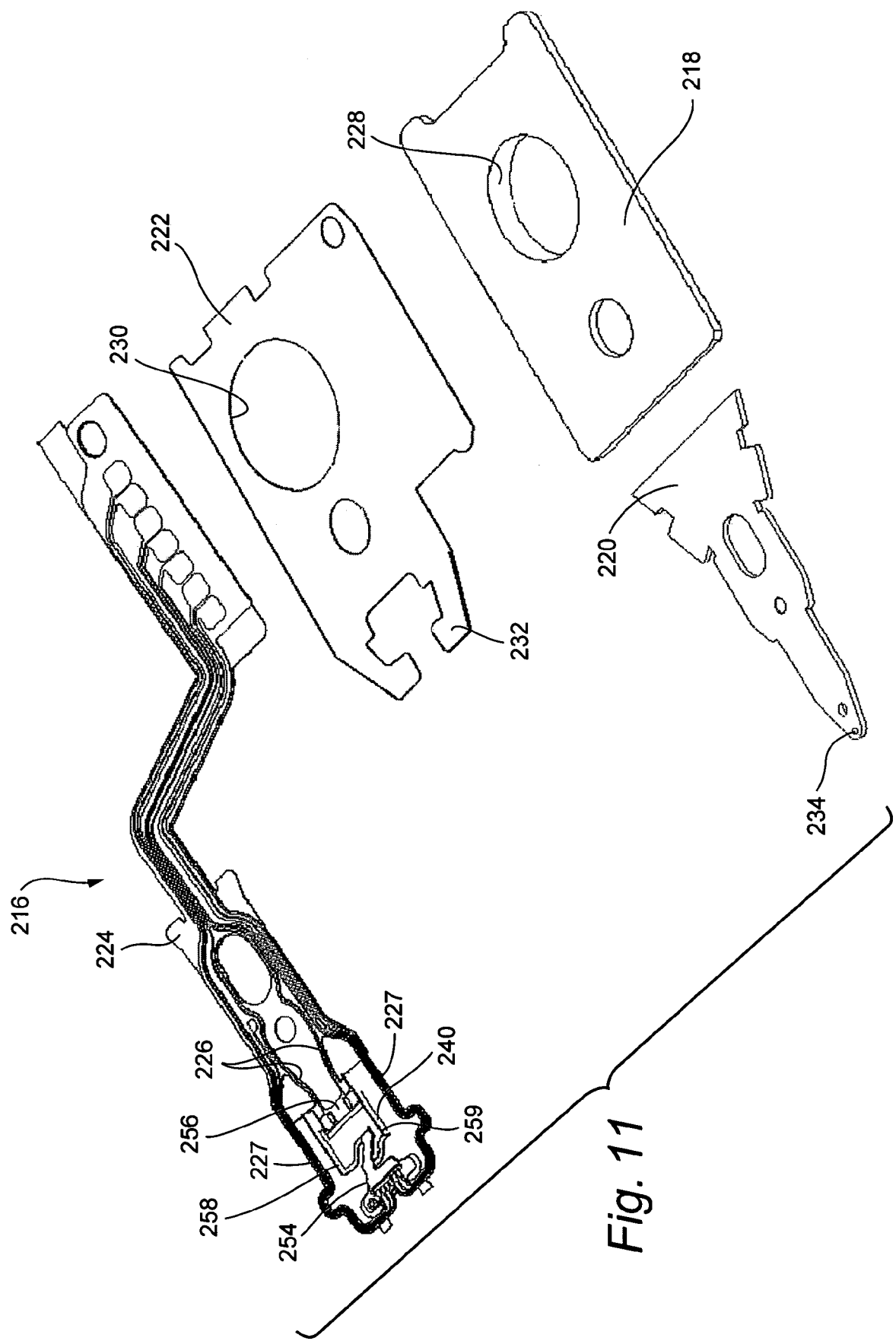
FIG. 11 is an exploded view of the suspension of the HGA shown in FIG. 8.

As best shown in FIGS. 8, 10, and 11, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by laser welding. As illustrated, the hinge 222 includes a hole 230 that aligns with the hole 228 provided in the base plate 218. Also, the hinge 222 includes a holder bar 232 for supporting the load beam 220.

The load beam 220 is mounted onto the holder bar 232 of the hinge 222, e.g., by laser welding. The load beam 220 has a dimple 234 formed thereon for engaging and supporting the PZT micro-actuator 212 (see FIG. 10).

The flexure 224 is mounted to the hinge 222 and the load beam 220, e.g., by laser welding. A frame 240, e.g., formed of metal, of the PZT micro-actuator 212 is integrated with the flexure 224 in the tongue area. The frame 240 engages the dimple 234 on the load beam 220. PZT elements 242, 243 are mounted to respective side arms of the frame 240. Also, the frame 240 supports the slider 214 on the suspension 216.

The suspension traces 226, 227 are provided on the flexure 224 to electrically connect a plurality of connection pads 238 (which connect to an external control system) with the slider 214 and the PZT elements 242, 243 of the PZT micro-actuator 212. The suspension traces 226, 227 may be a flexible printed circuit (FPC) and may include any suitable number of lines.

As best shown in FIGS. 9 and 12-14, bonding pads 244 are directly connected to the inner suspension traces 226 to electrically connect the inner suspension traces 226 with bonding pads 246 provided on the PZT elements 242, 243. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

As best shown in FIGS. 9 and 12-14, the PZT micro-actuator 212 includes the frame 240 integrated with the suspension flexure 224, and the PZT elements 242, 243 mounted to the frame 240.

The frame 240 includes a top support 254, a bottom support 256, and side arms 258, 259 that interconnect the top support 254 and the bottom support 256. As illustrated, the bottom support 256 is integrated with the flexure 224 in the tongue area. The top support 254 includes a rotatable plate 260, connection arms or bridges 262, 264 that couple the plate 260 to respective side arms 258, 259, and an electrical pad support plate 266. The rotatable plate 260 is aligned and engaged with the dimple 234 of the load beam 220.

Figure 12:
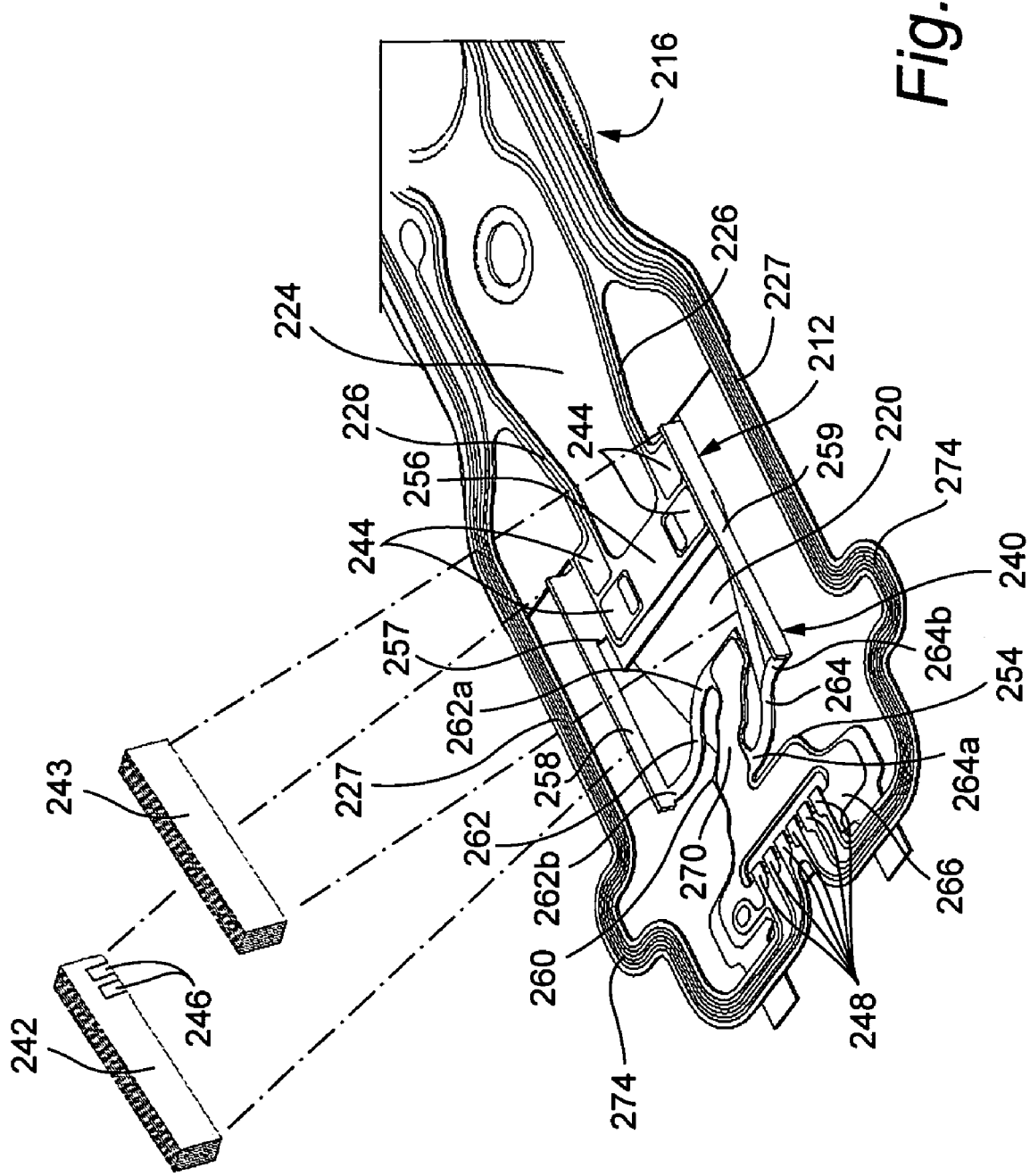
FIG. 12 is a partial perspective view of the HGA shown in FIG. 8 with the slider and PZT elements removed.

As best shown in FIGS. 12 and 14, inner notches or spaces 257 exist between the bottom support 256 and respective side arms 258, 259. This arrangement provides the side arms 258, 259 with a longer active length and will allow the side arms 258, 259 more freedom of movement.

As best shown in FIG. 14, the bridge 262 is curve-shaped and has opposing ends 262a, 262b, and the bridge 264 is curve-shaped has opposing ends 264a, 264b. The ends 262a and 264a are coupled with the rotatable plate 260, and the other ends 262b and 264b are coupled with respective side arms 258, 259. In the illustrated embodiment, the ends 262b and 264b are coupled with respective side arms 258, 259 in the same location in the y-axis direction, i.e., the ends 262b and 264b have the same distance between the coupling point to the end of the respective side arm 258, 259. Also, the ends 262a and 264a are coupled with the rotatable plate 260 in mirror relation to a center of the rotatable plate 260. That is, the coupling points of the ends 262a and 264a are symmetrically located with respect to the center of gravity of the rotatable plate 260. This arrangement allows the rotatable plate 260 to rotate around its center of gravity when the PZT elements 242, 243 are excited in use. However, the bridges 262, 264 may have other suitable shapes and coupling arrangements.

As best shown in FIGS. 12 and 13, a PZT element 242, 243 is mounted to an inwardly facing surface of a respective side arm 258, 259 of the frame 252. Bonding pads 246, e.g., two pads, are provided on each PZT element 242, 243 for electrically connecting each PZT element 242, 243 to the inner suspension traces 226. Each PZT element 242, 243 may be a ceramic PZT, thin-film PZT, or PMN-Pt, and may be single-layer or multi-layer.

As illustrated, bonding pads 244 connected to the inner suspension traces 226 are provided on the bottom support 256 of the frame 240. As shown in FIG. 9, the PZT bonding pads 246 provided on respective PZT elements 242, 243 are electrically connected to respective bonding pads 244 using, for example, electrical connection balls (GBB or SBB) 268. This allows power to be applied via the inner suspension traces 226 to the PZT elements 242, 243.

The top support 254 is structured to connect the frame 240 to the slider 214. Specifically, the rotatable plate 260 includes a step 270, e.g., constructed of a polymer layer, epoxy layer, or metal layer. The slider 214 is partially mounted on the step 270 of the rotatable plate 260 so that the slider 214 will not touch or engage the connection arms or bridges 262, 264 when the PZT micro-actuator 212 is operated.

Bonding pads 248 connected to the outer suspension traces 227 are provided on the electrical pad support plate 266 of the top support 254. As shown in FIG. 9, the bonding pads 250, e.g., six bonding pads, provided on the slider 214 are electrically connected to respective bonding pads 248 using, for example, electric connection balls (GBB or SBB) 272. This electrically connects the slider 214 and its read/write elements to the outer suspension traces 227.

In the illustrated embodiment, the outer suspension traces 227 each include a curved portion 274 adjacent respective sides of the slider 214. This arrangement helps to release stress due to stiffness of the outer suspension traces 227 when the PZT micro-actuator 212 is operated, which makes the PZT micro-actuator 212 work more smoothly.

Also, the dimple 234 of the suspension load beam 220 supports the gravity center of the rotatable plate 260. Thus, no parallel gap exists between the PZT micro-actuator 212 and the dimple 234, which facilitates manufacturing. Specifically, this arrangement does not require control of a gap or control of the stiffness of the suspension tongue to prevent tongue deformation that is known in the art.

When assembled, the center of the slider 214 is aligned with the center of the rotatable plate 260, which is aligned with the dimple 234 of the load beam 220. Thus, the center of the slider 214, the rotatable plate 260, and the dimple 234 are located or aligned along a common axis.

Specifically, the slider 214 is mounted to the rotatable plate 260 of the top support 254 such that the center of gravity of the slider 214 will substantially align with the center of gravity of the rotatable plate 260. Also, the frame 240 is integrated with the suspension flexure 224 such that the center of gravity of the rotatable plate 260 substantially aligns with the dimple 234 of the suspension 216. This arrangement allows the slider 214 and the rotatable plate 260 to freely rotate around the suspension dimple 234 when the rotatable plate 260 is rotated by exciting the PZT elements 242, 243.

FIG. 15*a* illustrates an embodiment of an electrical connection structure between the two PZT elements 242, 243 of the PZT micro-actuator 212, and FIG. 15*b* illustrates the operation voltage. As illustrated, the PZT elements 242, 243 have the same polarization direction and have a common ground. Also, a sine voltage is applied to operate the PZT elements 242, 243. FIG. 16*a* illustrates the PZT micro-actuator 212 in a relaxed state, and FIGS. 16*b* and 16*c* illustrates the PZT micro-actuator 212 when voltage is applied. As shown in FIGS. 16*b* and 16*c*, when the voltage goes to the first half period, the PZT elements 242, 243 will shrink, which will cause both side arms 258, 259 to bend or deform towards the inner side. Since the two bridges 262, 264 are coupled to the rotatable plate 260 in offset relation with respect to its center and the slider 214 is mounted on the rotatable plate 260, the slider 214 will rotate against its center towards the right side. When the voltage goes to the second half period, the PZT elements 242, 243 will return back or extend and the slider 214 will rotate back accordingly.

FIG. 17*a* illustrates another embodiment of an electrical connection structure between the two PZT elements 242, 243 of the PZT micro-actuator 212, and FIG. 17*b* illustrates the operation voltage. As illustrated, the PZT elements 242, 243 have opposite polarization directions and have a common ground. Also, two different sine voltages are applied to the PZT elements 242, 243 to operate the PZT elements 242, 243 separately. When the voltage goes to the first half period, since one of the PZT elements 242, 243 has a positive polarization direction and the other of the PZT elements 242, 243 has a negative polarization direction, the PZT elements 242, 243 will shrink, which will cause both side arms 258, 259 to bend or deform towards the inner side. Since the two bridges 262, 264 are coupled to the rotatable plate 260 in offset relation with respect to its center and the slider 214 is mounted on the rotatable plate 260, the slider 214 will rotate against its center towards the right side (e.g., see FIG. 16*b*). When the voltage goes to the second half period, the PZT elements 242, 243 will return back or extend and the slider 214 will rotate back accordingly.

Figure 7:
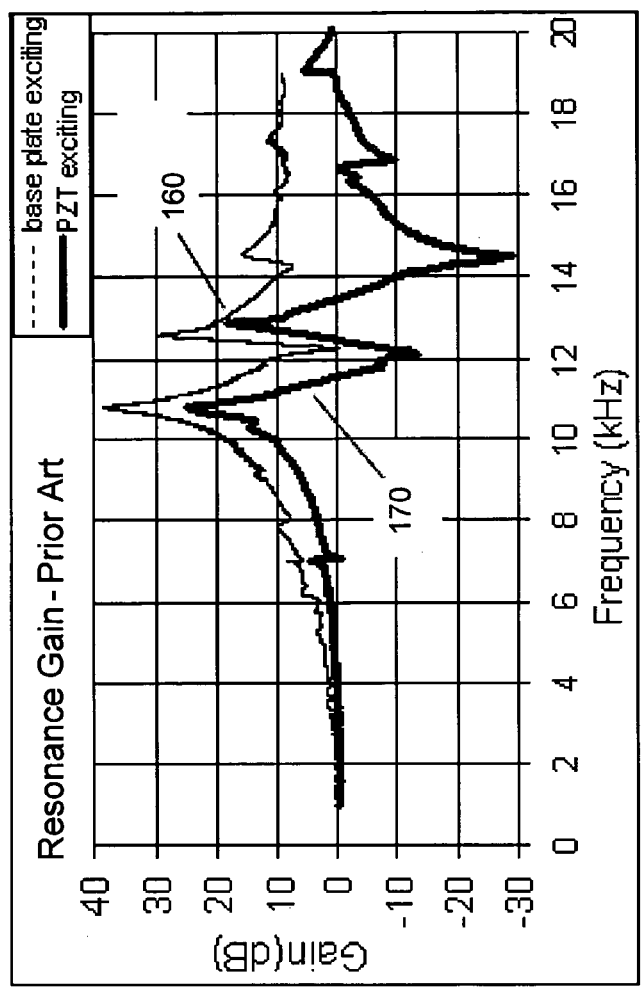
FIG. 7 shows testing data of the resonance of a prior PZT micro-actuator design.
Figure 6:
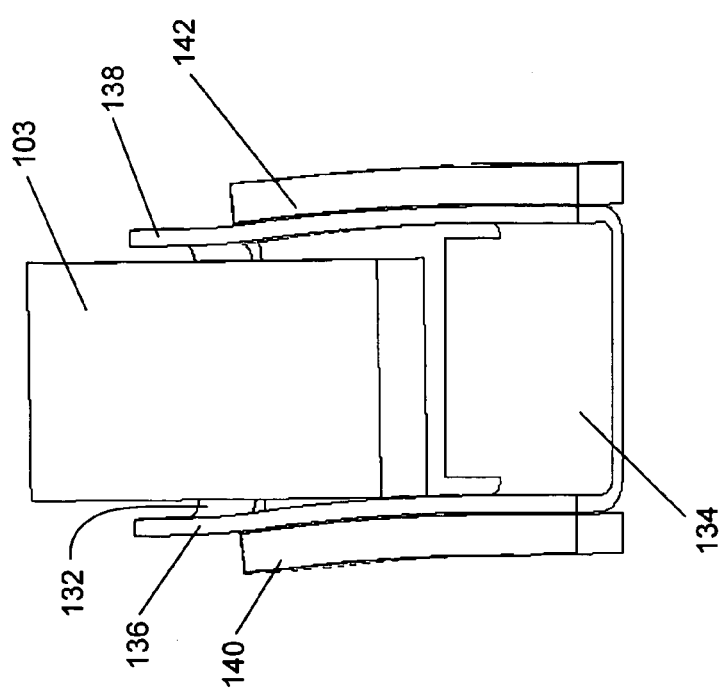
FIG. 6 is a top view of the slider and PZT micro-actuator of the HGA shown in FIG. 2 in use.
Figure 18:
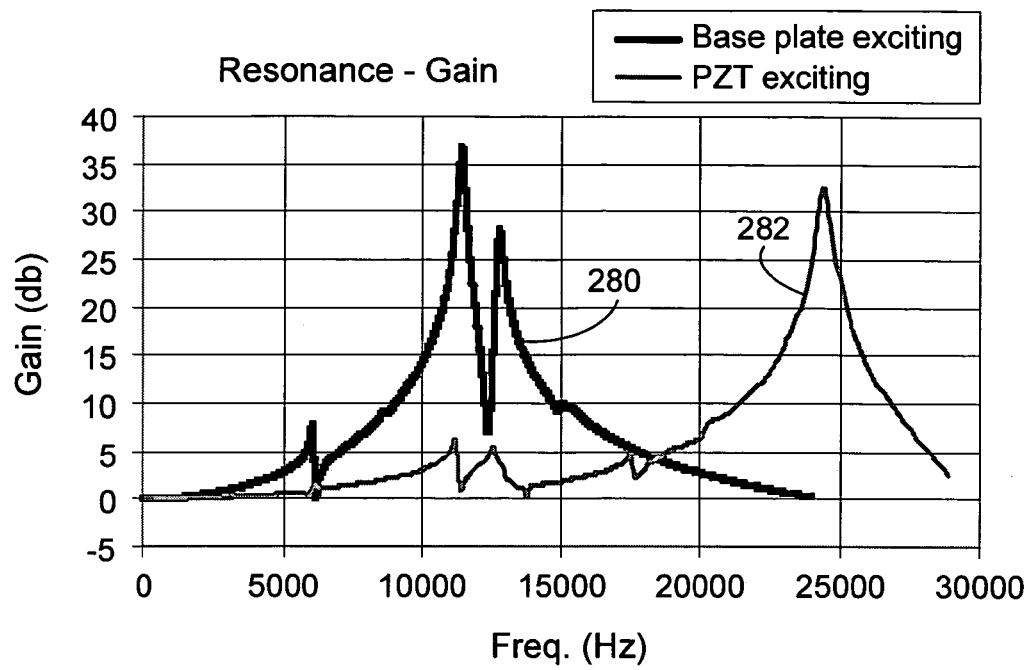
FIG. 18 shows testing data of the resonance gain of the PZT micro-actuator shown in FIG. 8.
Figure 19:
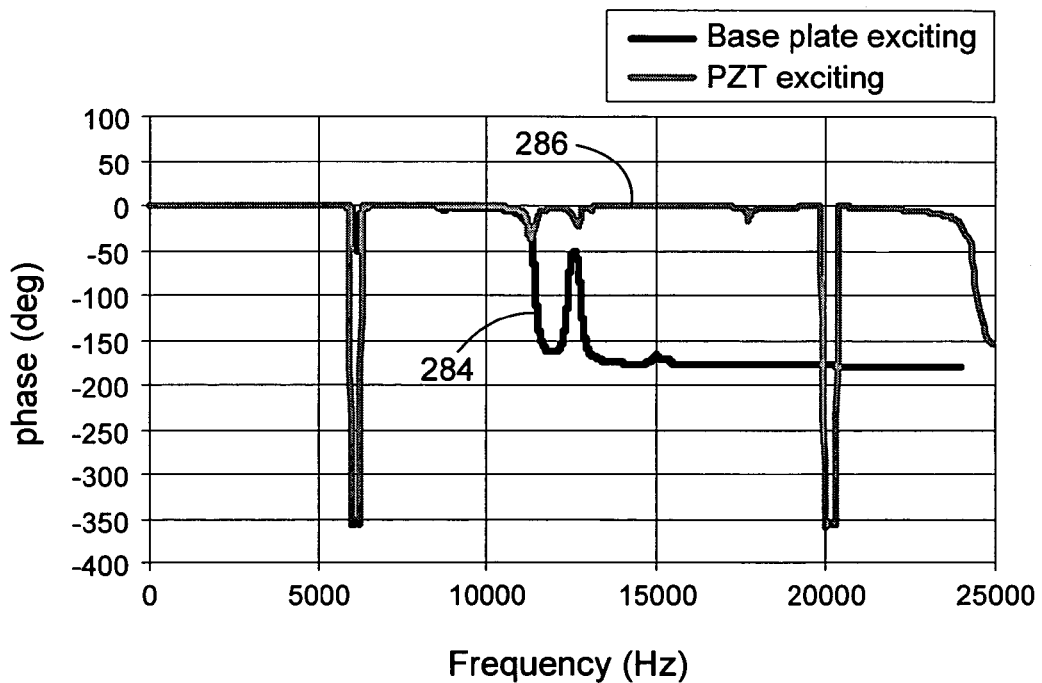
FIG. 19 shows testing data of the resonance phase of the PZT micro-actuator shown in FIG. 8.

FIGS. 18 and 19 illustrate resonance testing data of the PZT micro-actuator 212. FIG. 18 illustrates a resonance gain and FIG. 19 illustrates a resonance phase. As illustrated, the curves 280 and 284 illustrate the resonance gain and phase when the suspension base plate is shaken or excited, and the curves 282 and 286 illustrate the resonance gain and phase when the PZT elements 242, 243 of the PZT micro-actuator 212 are excited. Since the PZT micro-actuator 212 is integrated to the suspension, a relatively small reaction force is applied to the suspension when the PZT micro-actuator 212 is operated which improves the resonance. That is, the PZT micro-actuator 212 does not have a suspension resonance model like the prior model represented in FIG. 7. Thus, the PZT micro-actuator 212 greatly improves the performance characteristics of the disk drive device and a high bandwidth of the servo may be achieved.

Also, since the PZT micro-actuator 212 works as a rotation-type rather than a prior sway-type, the suspension structure may be simplified especially for tongue structure. This may facilitate manufacture of the suspension and reduce costs. Further, this may improve the static and dynamic performance of the HGA, e.g., the shock performance due to the mass reduction.

Figure 20:
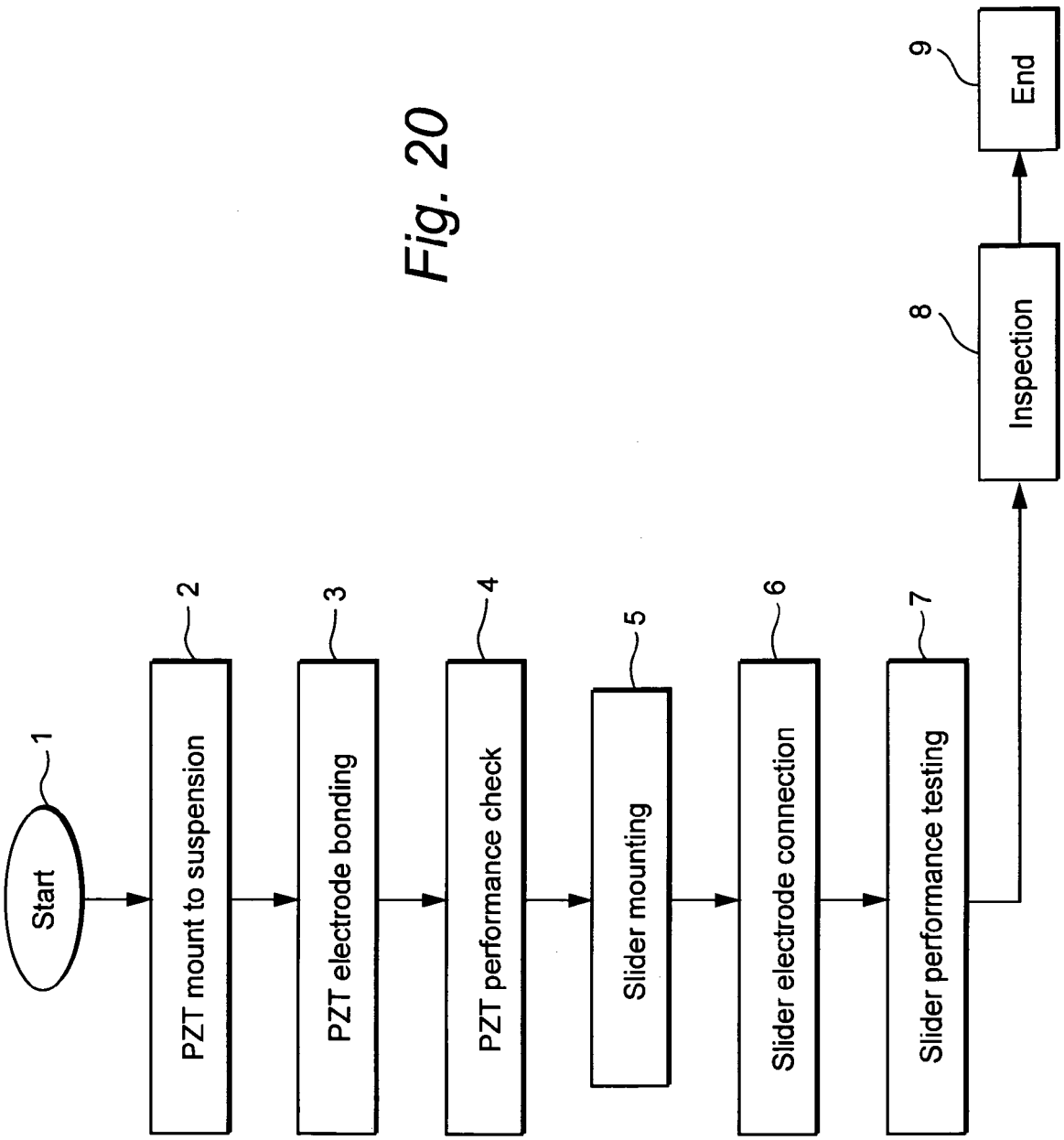
FIG. 20 is a flow chart illustrating a manufacturing and assembly process according to an embodiment of the present invention.

FIG. 20 illustrates the primary steps involved in the manufacturing and assembly process of the HGA 210 according to an embodiment of the present invention. After the process starts (step 1), PZT elements 242, 243 are mounted to the frame 240 integrated with the flexure 224 of the suspension 216 (step 2). The PZT elements 242, 243 are electrically bonded with the inner suspension traces 226 (step 3), and a performance check is conducted on the PZT elements 242, 243 (step 4). Then, the slider 214 is mounted to the frame 240 (step 5), and the slider 214 is electrically connected with the outer suspension traces 227 (step 6). A performance test is conducted on the slider (step 7). Finally, a final inspection is performed (step 8) to complete the manufacturing and assembly process (step 9).

FIGS. 21*a*-21*c* illustrate the primary steps involved in the manufacturing and assembly process of the HGA 210 according to another embodiment of the present invention. After the process starts, PZT elements 242, 243 are mounted to respective side arms 258, 259 of the frame 240 integrated with the flexure 224, as shown in FIGS. 21*a* and 21*b*. Then, the flexure 224 is mounted, e.g., by welding, to the base plate 218, load beam 220, and hinge 222 to form the suspension 216, as shown in FIG. 21*c*. In an embodiment, PZT elements may be mounted, e.g., by an automatic system, to respective flexures provided on a flexure sheet including multiple flexures. This arrangement may facilitate the assembly process and reduce costs.

Figure 22:
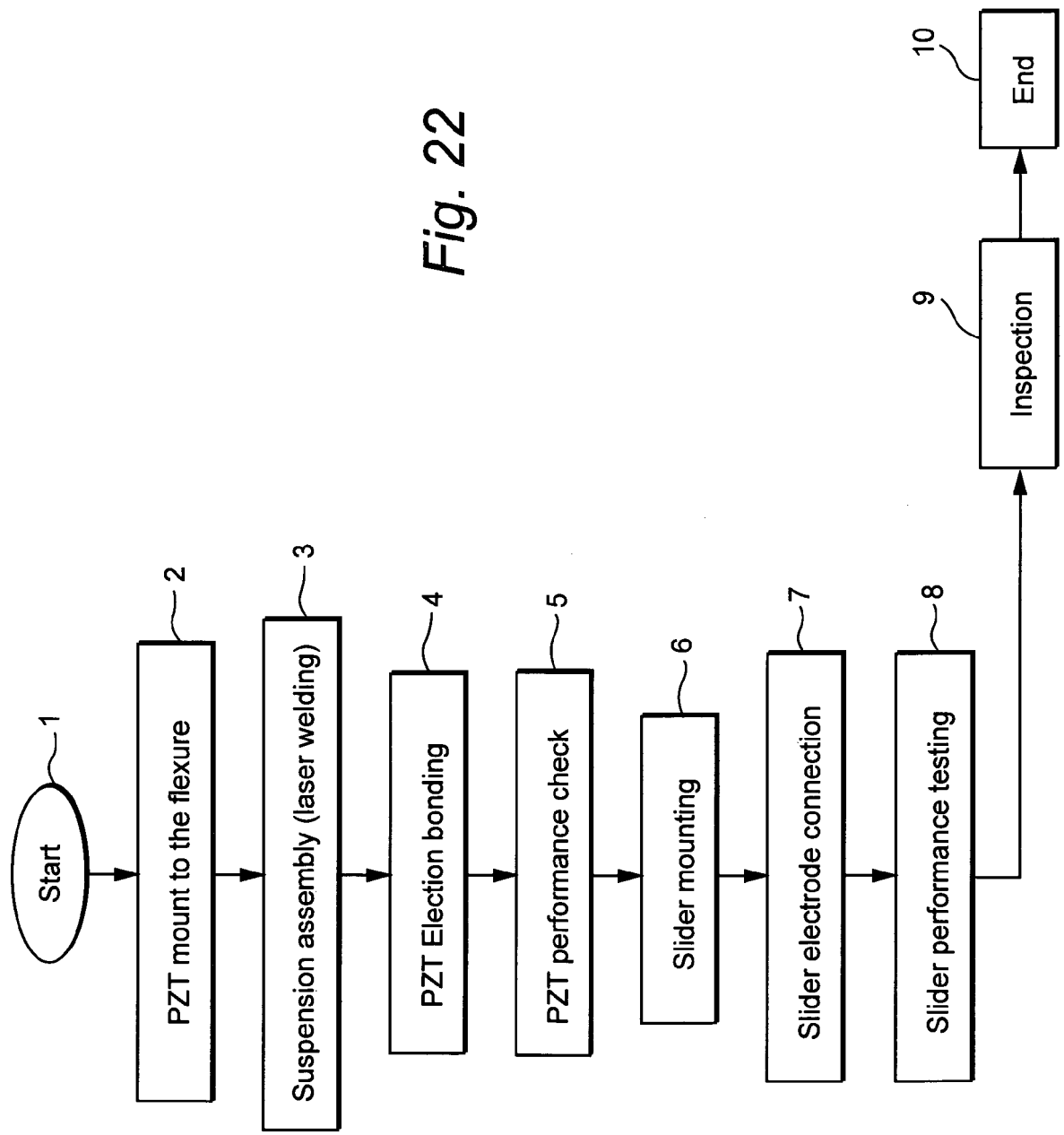
FIG. 22 is a flow chart illustrating a manufacturing and assembly process according to another embodiment of the present invention.

FIG. 22 illustrates the primary steps involved in the manufacturing and assembly process of the HGA 210 according to another embodiment of the present invention. After the process starts (step 1), PZT elements 242, 243 are mounted to the frame 240 integrated with the flexure 224 (step 2). Then, the flexure 224 is mounted, e.g., by laser welding, to the base plate 218, load beam 220, and hinge 222 to assemble the suspension 216 (step 3). The PZT elements 242, 243 are electrically bonded with the inner suspension traces 226 (step 4), and a performance check is conducted on the PZT elements 242, 243 (step 5). Next, the slider 214 is mounted to the frame 240 (step 6), and the slider 214 is electrically connected with the outer suspension traces 227 (step 7). A performance test is conducted on the slider (step 8). Finally, a final inspection is performed (step 9) to complete the manufacturing and assembly process (step 10).

Figure 23A:
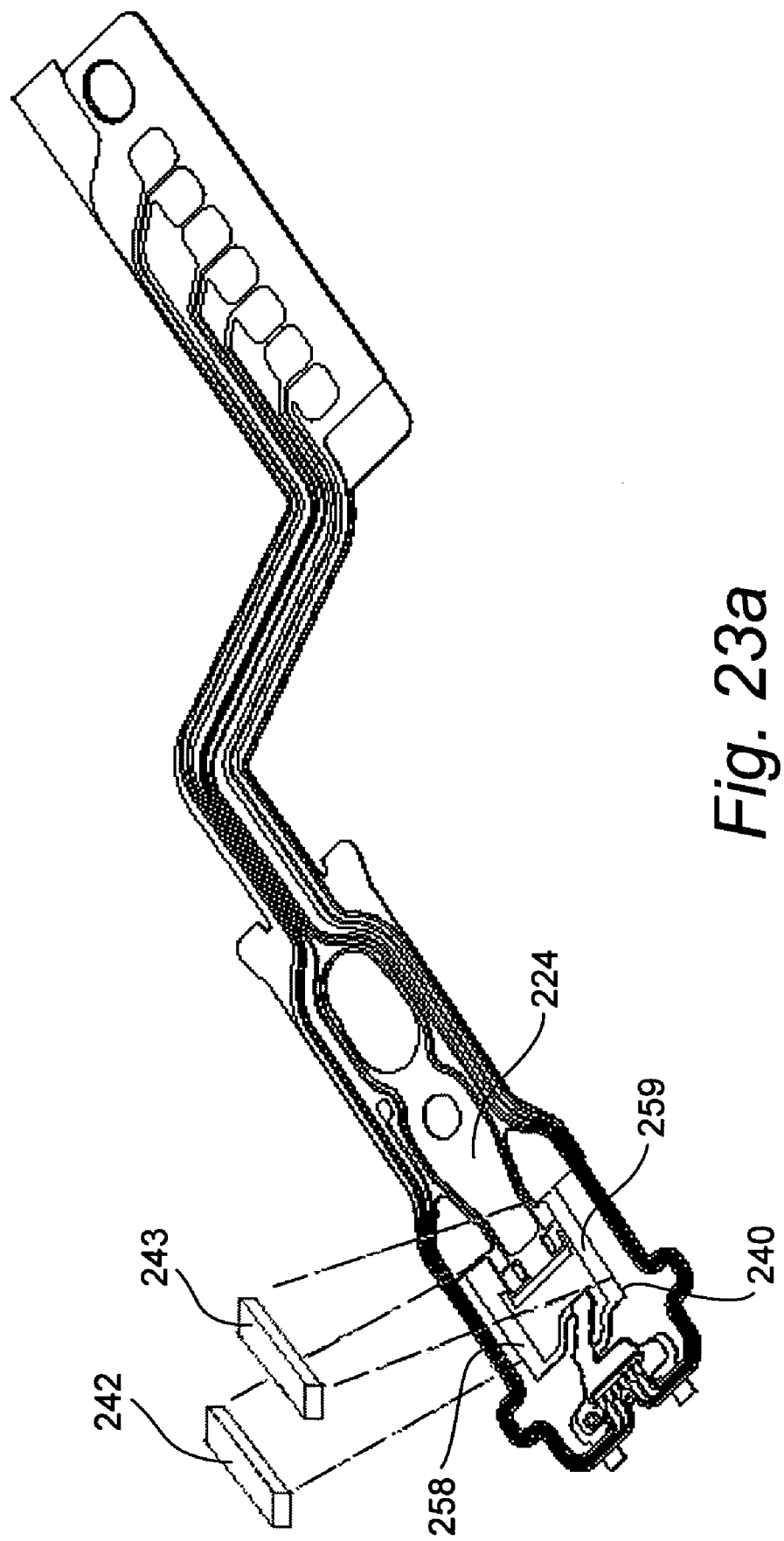
Figure 23D:
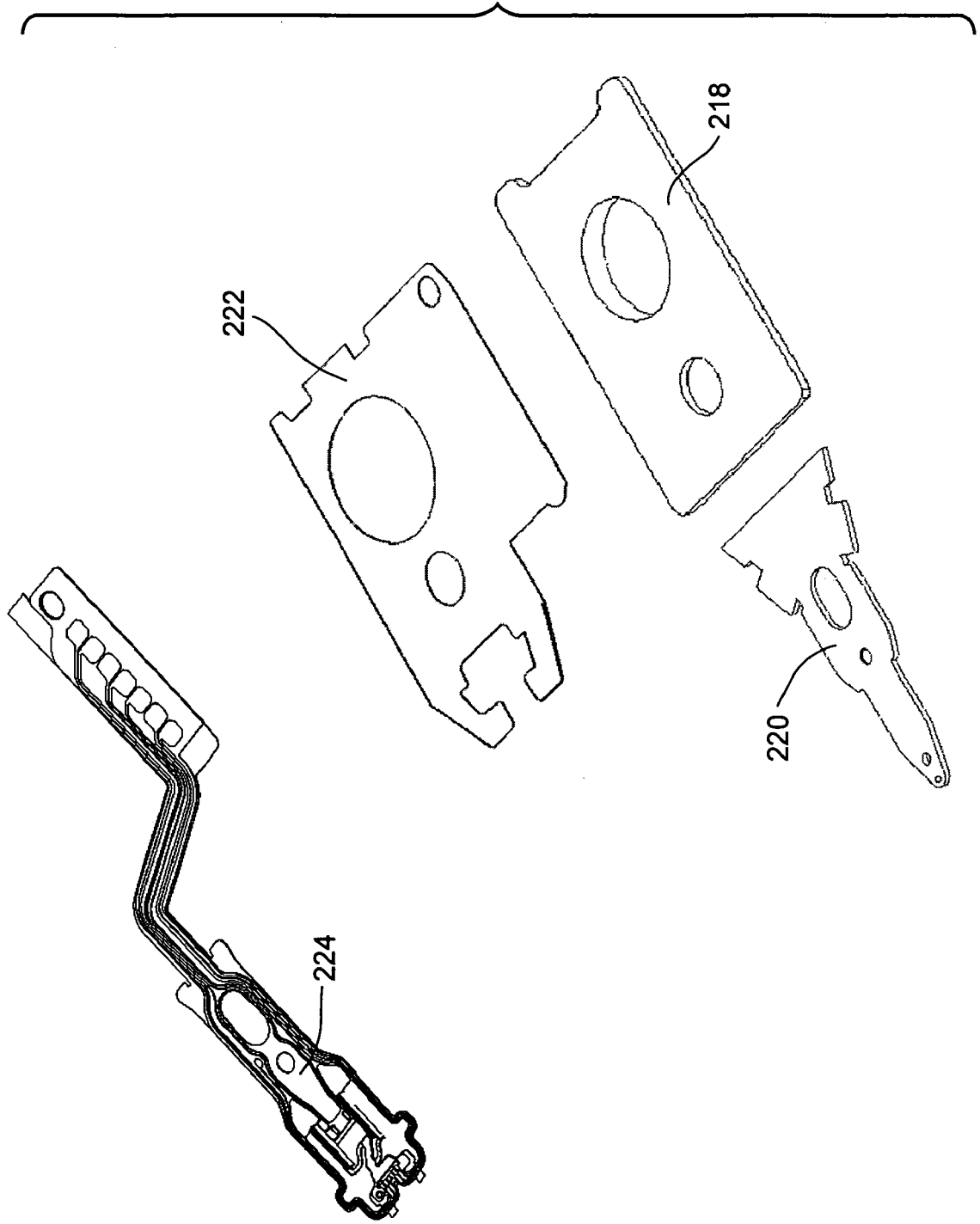

FIGS. 23*a*-23*d* illustrate the primary steps involved in the manufacturing and assembly process of the HGA 210 according to another embodiment of the present invention. After the process starts, PZT elements 242, 243 are mounted to respective side arms 258, 259 of the frame 240 integrated with the flexure 224, as shown in FIGS. 23*a* and 23*b*. As illustrated, the side arms 258, 259 are initially formed in a substantially flat condition. Then, the side arms 258, 258 are bent to form the upstanding side arms 258, 259 of the frame 240 as shown in FIG. 23c. Next, the flexure 224 is mounted, e.g., by welding, to the base plate 218, load beam 220, and hinge 222 to form the suspension 216, as shown in FIG. 21d. In an embodiment, PZT elements may be mounted, e.g., by an automatic system, to respective side arms provided on a flexure sheet including multiple flexures. After mounting, the side arms are bent to form the upstanding side arms of each frame. Then, each flexure is cut from the flexure sheet, and mounted, e.g., by welding, to the base plate, load beam, and hinge to form each suspension.

Figure 24:
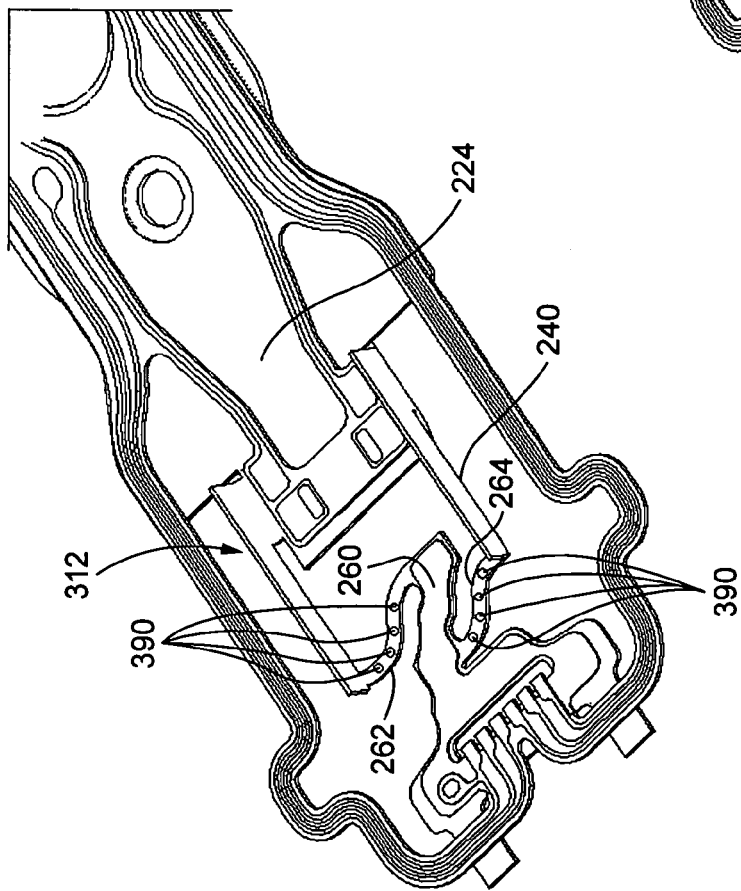
FIG. 24 is a partial perspective view of a PZT micro-actuator according to another embodiment of the present invention.

FIG. 24 illustrates a PZT micro-actuator 312 according to another exemplary embodiment of the present invention. In this embodiment, each bridge 262, 264 of the frame 240 includes at least one hole 390. The holes 390 help to reduce stiffness when the PZT micro-actuator 312 is operated. The remaining components of the PZT micro-actuator 312 are substantially similar to the PZT micro-actuator 212 and indicated with similar reference numerals. Although structurally different, the PZT micro-actuator 312 has a substantially similar work principle as the PZT micro-actuator 212.

Figure 25:
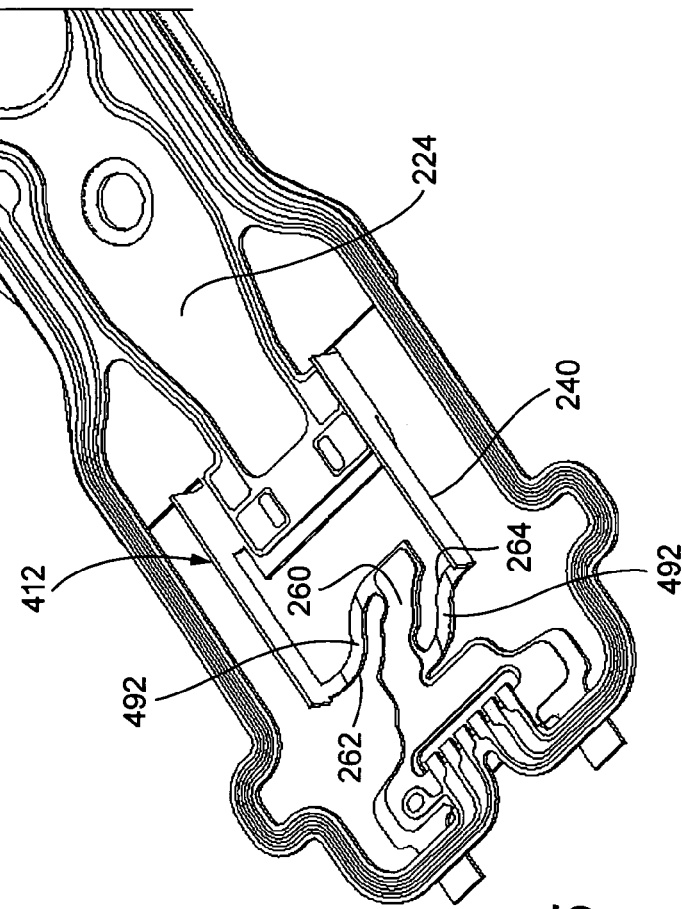
FIG. 25 is a partial perspective view of a PZT micro-actuator according to another embodiment of the present invention.

FIG. 25 illustrates a PZT micro-actuator 412 according to another exemplary embodiment of the present invention. In this embodiment, each bridge 262, 264 of the frame 240 includes at least one partially etched region 492. The etched regions 492 help to reduce stiffness when the PZT micro-actuator 412 is operated. The remaining components of the PZT micro-actuator 412 are substantially similar to the PZT micro-actuator 212 and indicated with similar reference numerals. Although structurally different, the PZT micro-actuator 412 has a substantially similar work principle as the PZT micro-actuator 212.

Figure 26:
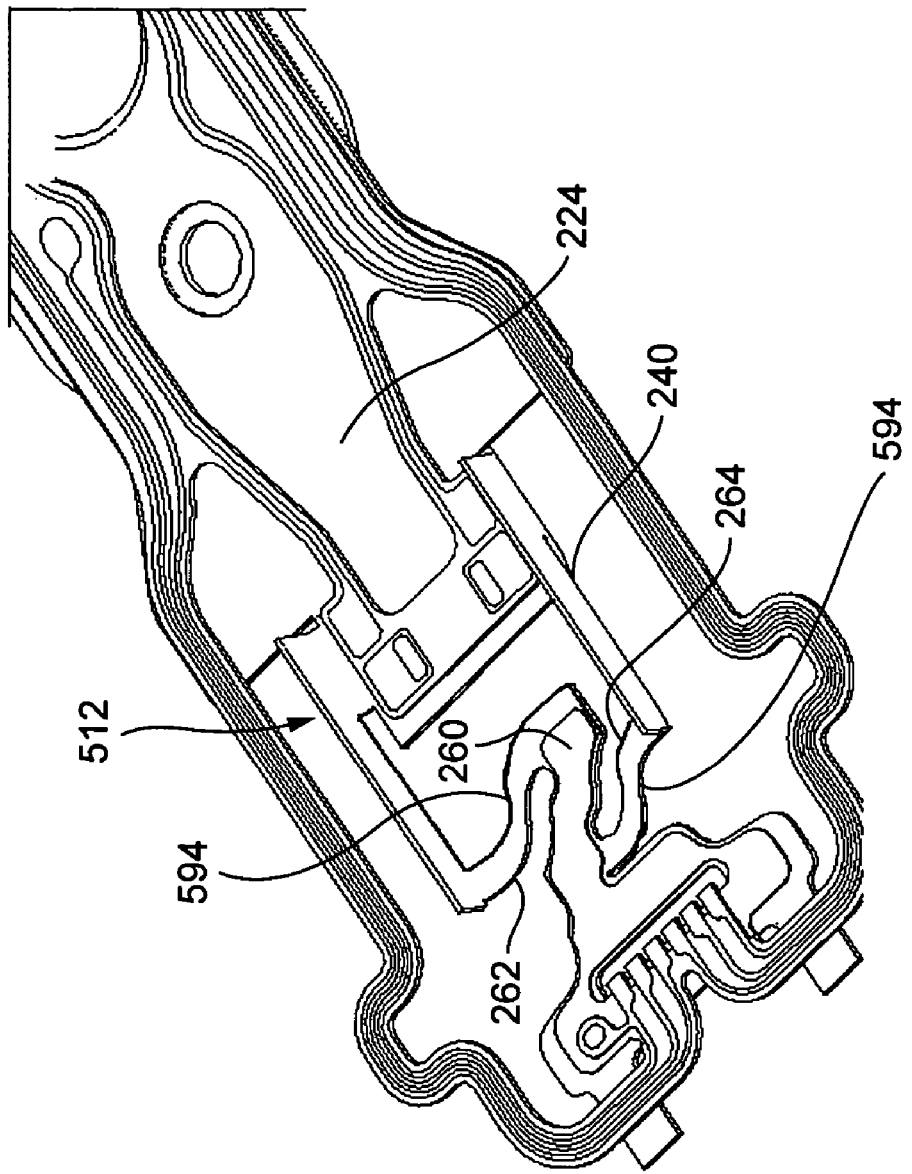
FIG. 26 is a partial perspective view of a PZT micro-actuator according to another embodiment of the present invention.

FIG. 26 illustrates a PZT micro-actuator 512 according to another exemplary embodiment of the present invention. In this embodiment, each bridge 262, 264 of the frame 240 includes a weak point 594. That is, the ends of each bridge 262, 264 are wider than the middle region of each bridge 262, 264. The weak points 594 help to reduce stiffness when the PZT micro-actuator 512 is operated. The remaining components of the PZT micro-actuator 512 are substantially similar to the PZT micro-actuator 212 and indicated with similar reference numerals. Although structurally different, the PZT micro-actuator 512 has a substantially similar work principle as the PZT micro-actuator 212.

A head gimbal assembly 210 incorporating a PZT micro-actuator 212, 312, 412, 512 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator. In an embodiment, the PZT micro-actuator is used in a high RPM disk drive device.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
a metal frame including
a bottom support which is integrated with a suspension flexure of the head gimbal assembly,
a top support adapted to support a slider of the head gimbal assembly, and
a pair of side arms that interconnect the top support and the bottom support,
the top support including a rotatable plate, the rotatable plate having a center of gravity directly supported by a dimple of the head gimbal assembly, connection arms that couple the rotatable plate to respective side arms, and an electrical pad support plate that supports bonding pads; and
a PZT element mounted to each of the side arms, each PZT element being excitable to cause selective movement of the side arms.

2. The micro-actuator according to claim 1, wherein each PZT element is mounted to an inwardly facing surface of a respective side arm.

3. The micro-actuator according to claim 1, wherein each PZT element is a thin-film PZT, ceramic PZT, or PMN-PT.

4. The micro-actuator according to claim 3, wherein each PZT element is single-layer or multi-layer.

5. The micro-actuator according to claim 1, wherein the rotatable plate includes a step to support the slider so that the slider does not engage the connection arms in use.

6. The micro-actuator according to claim 5, wherein the step is constructed of a polymer layer, epoxy layer, or metal layer.

7. The micro-actuator according to claim 1, wherein the connection arms of the top support have a curved configuration.

8. The micro-actuator according to claim 1, wherein the connection arms are coupled with respective side arms in the same location along a longitudinal axis of the frame.

9. The micro-actuator according to claim 1, wherein the ends of the connection arms are coupled with the rotatable plate in mirror relation to a center of the rotatable plate.

10. The micro-actuator according to claim 1, wherein inner notches or spaces exist between the bottom support and respective side arms.

11. The micro-actuator according to claim 1, wherein each of the connection arms includes at least one hole.

12. The micro-actuator according to claim 1, wherein each of the connection arms includes at least one partially etched region.

13. The micro-actuator according to claim 1, wherein each of the connection arms includes ends that are wider than a middle region.

14. A head gimbal assembly comprising:
a micro-actuator;
a slider; and
a suspension including a suspension flexure and a dimple provided at a center of the slider,
wherein the micro-actuator includes:
a metal frame including
a bottom support which is integrated with the suspension flexure,
a top support to support the slider, and
a pair of side arms that interconnect the top support and the bottom support,
the top support including a rotatable plate, the rotatable plate having a center of gravity directly supported by the dimple of the head gimbal assembly, connection arms that couple the rotatable plate to respective side arms, and an electrical pad support plate that supports bonding pads; and a PZT element mounted to each of the side arms, each PZT element being excitable to cause selective movement of the side arms.

15. The head gimbal assembly according to claim 14, wherein the suspension includes a load beam, the load beam having a dimple that engages the rotatable plate.

16. The head gimbal assembly according to claim 15, wherein a center of the slider, a center of the rotatable plate, and the dimple are aligned along a common axis.

17. The head gimbal assembly according to claim 14, wherein each PZT element is mounted to an inwardly facing surface of a respective side arm.

18. The head gimbal assembly according to claim 14, wherein each PZT element is a thin-film PZT, ceramic PZT, or PMN-PT.

19. The head gimbal assembly according to claim 18, wherein each PZT element is single-layer or multi-layer.

20. The head gimbal assembly according to claim 14, wherein the rotatable plate includes a step to support the slider so that the slider does not engage the connection arms in use.

21. The head gimbal assembly according to claim 20, wherein the step is constructed of a polymer layer, epoxy layer, or metal layer.

22. The head gimbal assembly according to claim 14, wherein the connection arms of the top support have a curved configuration.

23. The head gimbal assembly according to claim 14, wherein the connection arms are coupled with respective side arms in the same location along a longitudinal axis of the frame.

24. The head gimbal assembly according to claim 14, wherein the ends of the connection arms are coupled with the rotatable plate in mirror relation to a center of the rotatable plate.

25. The head gimbal assembly according to claim 14, wherein inner notches or spaces exist between the bottom support and respective side arms.

26. The head gimbal assembly according to claim 14, wherein each of the connection arms includes at least one hole.

27. The head gimbal assembly according to claim 14, wherein each of the connection arms includes at least one partially etched region.

28. The head gimbal assembly according to claim 14, wherein each of the connection arms includes ends that are wider than a middle region.

29. A disk drive device comprising:
a head gimbal assembly including a micro-actuator, a slider, and a suspension including a suspension flexure and a dimple provided at a center of the slider;
a drive arm connected to the head gimbal assembly;
a disk; and
a spindle motor operable to spin the disk,
wherein the micro-actuator includes:
a metal frame including
a bottom support which is integrated with the suspension flexure,
a top support to support the slider, and
a pair of side arms that interconnect the top support and the bottom support,
the top support including a rotatable plate, the rotatable plate having a center of gravity directly supported by the dimple of the head gimbal assembly, connection arms that couple the rotatable plate to respective side arms, and an electrical pad support plate that supports bonding pads; and
a PZT element mounted to each of the side arms, each PZT element being excitable to cause selective movement of the side arms.

30. A head gimbal assembly comprising:
a micro-actuator;
a slider; and
a suspension including a suspension flexure,
the micro-actuator includes:
a metal frame including
a bottom support which is integrated with the suspension flexure,
a top support to support the slider, and
a pair of side arms that interconnect the top support and the bottom support,
the top support including a rotatable plate, connection arms that couple the rotatable plate to respective side arms, and an electrical pad support plate that supports bonding pads; and
a PZT element mounted to each of the side arms, each PZT element being excitable to cause selective movement of the side arms,
wherein the suspension includes a load beam having a dimple that engages the rotatable plate, and wherein a center of the slider, a center of the rotatable plate, and the dimple are aligned along a common axis.

* * * * *